United States Patent
Kurve et al.

(10) Patent No.: US 10,685,008 B1
(45) Date of Patent: Jun. 16, 2020

(54) FEATURE EMBEDDINGS WITH RELATIVE LOCALITY FOR FAST PROFILING OF USERS ON STREAMING DATA

(71) Applicant: PINDROP SECURITY, INC., Atlanta, GA (US)

(72) Inventors: Aditya Kurve, Atlanta, GA (US); Hassan Kingravi, Atlanta, GA (US)

(73) Assignee: Pindrop Security, Inc., Atlanta, GA (US)

(*) Notice: Subject to any disclaimer, the term of this patent is extended or adjusted under 35 U.S.C. 154(b) by 482 days.

(21) Appl. No.: 15/587,143

(22) Filed: May 4, 2017

Related U.S. Application Data

(60) Provisional application No. 62/370,149, filed on Aug. 2, 2016.

(51) Int. Cl.
*G06F 16/23* (2019.01)
*G10L 17/04* (2013.01)
*G10L 17/18* (2013.01)
*G06F 21/44* (2013.01)

(52) U.S. Cl.
CPC .............. *G06F 16/23* (2019.01); *G06F 21/44* (2013.01); *G10L 17/04* (2013.01); *G10L 17/18* (2013.01)

(58) Field of Classification Search
None
See application file for complete search history.

(56) References Cited

U.S. PATENT DOCUMENTS

| | | | |
|---|---|---|---|
| 6,799,175 B2 | 9/2004 | Aggarwal | |
| 8,051,468 B2* | 11/2011 | Davis | G06F 21/32 |
| | | | 713/186 |
| 8,209,269 B2 | 6/2012 | Schoelkopf et al. | |
| 8,312,157 B2 | 11/2012 | Jakobsson et al. | |
| 8,843,754 B2* | 9/2014 | Alward | G06F 21/316 |
| | | | 713/182 |
| 9,015,201 B2 | 4/2015 | McCloskey et al. | |
| 9,071,969 B2 | 6/2015 | Turgeman | |
| 9,185,095 B1* | 11/2015 | Moritz | H04L 63/102 |

(Continued)

OTHER PUBLICATIONS

A. Rahimi and B. Recht, "Random Features for Large-Scale Kernel Machines," Adv. Neural Inf. Process. Syst., vol. 20, pp. 1177-1184, 2007.

(Continued)

*Primary Examiner* — Uyen T Le
(74) *Attorney, Agent, or Firm* — Foley & Lardner LLP

(57) ABSTRACT

Systems and methods for classification using an explicit feature map or an approximate feature map based on a relative locality measure. In at least one embodiment, a method of authenticating a user operates data points having feature vectors pertaining to user events comprises selecting an approximate feature map based on a subset of features in each data point and a relative locality measure of a cluster including a plurality of the data points; mapping, to a feature space, the subset of features in each data point and a new data point pertaining to a phone call of the user using the selected approximate feature map; determining a classification of the new data point based on its relative locality measure with respect to a cluster in the feature space; storing the classification of the new data point in a memory device; and authenticating the user during the phone call.

36 Claims, 20 Drawing Sheets

(56) References Cited

U.S. PATENT DOCUMENTS

| | | | |
|---|---|---|---|
| 9,218,410 | B2 | 12/2015 | Gray et al. |
| 2004/0025044 | A1* | 2/2004 | Day .................... H04L 63/1408 726/23 |
| 2013/0159188 | A1* | 6/2013 | Andon ................ G06Q 20/4014 705/44 |
| 2014/0358535 | A1 | 12/2014 | Lee et al. |
| 2015/0256339 | A1* | 9/2015 | Voloshynovskiy ..... G06F 21/14 380/44 |
| 2015/0317475 | A1* | 11/2015 | Aguayo Gonzalez .. G06F 21/55 726/23 |
| 2016/0191561 | A1* | 6/2016 | Eskin .................... G06F 16/84 726/23 |
| 2016/0335432 | A1 | 11/2016 | Vatamanu et al. |

OTHER PUBLICATIONS

B. Schölkopf, A. Smola, and K.-R. Müller, "Nonlinear Component Analysis as a Kernel Eigenvalue Problem," Neural Comput., vol. 10, No. 5, pp. 1299-1319, Jul. 1998.

C. E. Rasmussen and C. K. I. Williams, "Gaussian processes for machine learning", MIT Press, 2006.

C. K. I. Williams and M. Seeger, "Using the Nyström Method to Speed Up Kernel Machines," Adv. Neural Inf. Process. Syst., vol. 13, pp. 682-688, 2001.

E. Pękalska, P. Paclík, and R. P. W. Duin, "A Generalized Kernel Approach to Dissimilarity-based Classification," J. Mach. Learn. Res., vol. 2, pp. 175-211, 2001.

F. Rosenblatt, "The Perceptron: A probabilistic Model for Information Storage and Organization in the Brain.," Psychological Review, vol. 65, No. 6, pp. 386-408, 1958.

P. Kenny, G. Boulianne, P. Ouellet, and P. Dumouchel, "Joint Factor Analysis versus Eigenchannels in Speaker Recognition," IEEE Trans. Audio, Speech Lang. Process., vol. 15, No. 4, pp. 1435-1447, May 2007.

Sang-Woon Kim and R. P. W. Duin, "An Empirical Comparison of Kernel-Based and Dissimilarity-Based Feature Spaces," Springer Berlin Heidelberg, 2010, pp. 559-568.

\* cited by examiner

ADDING A THIRD NOISY FEATURE

HYPERSPHERES WITH THIRD NOISY FEATURE

Algorithm 8 Offline tuning of feature selection and kernel selection (e.g. in user authentication).

$\hat{\chi} := \infty$
$(\hat{k}, \hat{l}) := (0,0)$
For $k \in \{1,2,...,K\}$
    For $l \in \{1,2,...,L\}$
        For $i \in \{1,2,...,N\}$
            Use $\bar{\psi}_k$ to map features in $F_l$ of $x_i$ to $\mathcal{H}_k$
        For $m \in \{1,2,...,M\}$
            $\mathcal{C}_m := \emptyset$
            For $i \in \{1,2,...,N\}$
                If $y_i$ corresponds to user $\omega_m$
                    Include $x_i$ in $\mathcal{C}_m$
            Determine the centroid $c_m$ of $\mathcal{C}_m$
            Determine the average $A_m^{k,l}$ of $\mathcal{D}(x_i, c_m)$ over all $x_i \in \mathcal{C}_m$
        Determine the average $\chi_{k,l}$ of all $A_m^{k,l}, m \in \{1,2,...,M\}$
        If $\chi_{k,l} < \hat{\chi}$
            $\hat{\chi} := \chi_{k,l}$
            $(\hat{k}, \hat{l}) := (k, l)$
Return $(\hat{k}, \hat{l})$

FIG. 7A

Algorithm 9 User-specific threshold determination algorithm.

For $r \in \{1,2,...,R\}$
    Use $\bar{\psi}_{\hat{k}}$ to map features in $F_{\hat{l}}$ of $x_r$ to $\mathcal{H}_{\hat{k}}$
For $u \in \{1,2,...,U\}$
    $\mathcal{C}_u := \emptyset$
    For $r \in \{1,2,...,R\}$
        If $y_r$ corresponds to user $\omega_u$
            Include $x_r$ in $\mathcal{C}_u$
    Determine the centroid $c_u$ of $\mathcal{C}_u$
    $x_t := \arg\max_{x_r \in \mathcal{C}_u} \mathcal{D}(x_r, c_u)$
    $T_u := \mathcal{D}(x_t, c_u)$
Return $T_u$

FIG. 7B

Algorithm 10 Offline tuning of feature selection and kernel selection (e.g. for fraud detection).

$\hat{\chi} := \infty$
$(\hat{k}, \hat{l}) := (0,0)$
For $k \in \{1,2,...,K\}$
    For $l \in \{1,2,...,L\}$
        $C_{NG} := \emptyset$
        For $i \in \{1,2,...,N\}$
            Use $\bar{\psi}_k$ to map features in $F_l$ of $x_i$ to $\mathcal{H}_k$
            If $y_i$ includes a "not_genuine" flag
                Include $x_i$ in $C_{NG}$
        Determine the centroid $c_{NG}$ of $C_{NG}$
        Determine the average $\chi_{k,l}$ of $\mathcal{D}(x_i, c_{NG})$ over all $x_i \in C_{NG}$
        If $\chi_{k,l} < \hat{\chi}$
            $\hat{\chi} := \chi_{k,l}$
            $(\hat{k}, \hat{l}) := (k, l)$
Return $(\hat{k}, \hat{l})$

FIG. 8A

Algorithm 11 Non-genuineness threshold determination algorithm.

For $i \in \{1,2,...,N\}$
    Use $\bar{\psi}_{\hat{k}}$ to map features in $F_{\hat{l}}$ of $x_i$ to $\mathcal{H}_{\hat{k}}$
    If $y_i$ includes a "not_genuine" flag
        Include $x_i$ in $C_{NG}$
Determine the centroid $c_{NG}$ of $C_{NG}$
$x_t := \arg\max_{x_i \in C_{NG}} \mathcal{D}(x_i, c_{NG})$
$T := \mathcal{D}(x_t, c_{NG})$
Return $T$

FIG. 8B

Algorithm 1 Linear perceptron algorithm
Input: Input data $\mathcal{D} = \{(x_1, y_1), \ldots, (x_N, y_N)\}$.
1. Initialize $w := 0$ in $\mathbb{R}^D$.
2. Perform the following:
    while $f(x_i) \neq y_i$ for any point $(x_i, y_i)$ do
        If $y_i(\langle w, x_i \rangle_{\mathbb{R}^D} + b) < 0$, then $w \leftarrow w + y_i x_i$ and $b := b + y_i$.
    end while

FIG. 12A

Algorithm 2 Kernel perceptron algorithm 1
Input: Input data $\mathcal{D} = \{(x_1, y_1), \ldots, (x_N, y_N)\}$.
1. Initialize $\mathbf{w} := 0$ in $\mathcal{H}$.
2. Perform the following:
    while $f(x_i) \neq y_i$ for any point $(x_i, y_i)$ do
        If $y_i(\langle \mathbf{w}, \psi(x_i) \rangle_{\mathcal{H}}) < 0$, then $\mathbf{w} \leftarrow \mathbf{w} + y_i \psi(x_i)$.
    end while

FIG. 12B

Algorithm 3 Kernel perceptron algorithm 2
Input: Input data $\mathcal{D} = \{(x_1, y_1), \ldots, (x_N, y_N)\}$.
1. Initialize $\mathbf{w} := 0$ in $\mathcal{H}$.
2. Perform the following:
    while $f(x_i) \neq y_i$ for any point $(x_i, y_i)$ do
        If $y_i(\langle \mathbf{w}, \psi(x_i) \rangle_{\mathcal{H}}) < 0$, then $\gamma_i \leftarrow \gamma_i + y_i$.
    end while

FIG. 12C

Algorithm 4 Nyström algorithm.

Input: Kernel $k$, data $\mathcal{X} = \{x_1, ..., x_N\}, x_i \in \mathbb{R}^D$, chosen size of subset $M$, and chosen size of eigenvalue expansion $F$.

1. Sample subset $\mathcal{C} = \{c_1, ..., c_M\}$ from $\mathcal{X}$, and compute Gram matrix $K$.
2. Compute eigendecomposition $K = U\Lambda U^T$.
3. Given a new data point $x$, compute kernel vector $$\mathbf{k}_x = [k(c_1, x) k(c_2, x) \ldots k(c_F, x)],$$

so that $\mathbf{k}_x \in \mathbb{R}^F$.

4. Compute explicit kernel map $$\hat{\psi}(x) := \frac{1}{\sqrt{M}} \left[ \sqrt{\lambda_1} U^{(1)^T} \mathbf{k}_x \sqrt{\lambda_2} U^{(2)^T} \mathbf{k}_x \ldots \sqrt{\lambda_F} U^{(F)^T} \mathbf{k}_x \right],$$

where $U^{(j)}$ is the $j$th column of the eigenvector matrix $U$.

FIG. 13

Algorithm 5 Generic RFF algorithm.

Input: Shift-invariant kernel $k$ with parameters $\gamma$ and point $x \in \mathbb{R}^D$.
1. Compute Fourier transform of kernel: $p(\omega)$.
2. Sample set of frequencies $[\omega_1, \omega_2, ..., \omega_M] \sim p(\omega)$.
3. Compute feature map $$\hat{\psi}(x) := \frac{1}{\sqrt{M}} \left[ e^{i\omega_1^T x} e^{i\omega_2^T x} ... e^{i\omega_M^T x} \right].$$

FIG. 14A

Algorithm 6 RFF algorithm for RBF kernel.

Input: RBF kernel $k$ with parameter $\gamma$ and point $x \in \mathbb{R}^D$.
1. Compute random matrix $\Psi \in \mathbb{R}^{M \times D}$ where each entry is sampled from unit-norm Gaussian distribution $\mathcal{N}(0,1)$.
2. Scale random matrix as $\Psi \to \frac{1}{\gamma} \Psi$.
3. Given input data point $x$, the feature map is given by $$\hat{\psi}(x) := \frac{1}{\sqrt{M}} \begin{bmatrix} \sin(\Psi x) \\ -\cos(\Psi x) \end{bmatrix}.$$

FIG. 14B

Algorithm 7 Generic BinF algorithm.

Input: Kernel $k(x,y) = \prod_{i=1}^{D} k_i(|x^i - y^i|)$ with parameter $\gamma$, input dimension $D$, and number of basis functions (bins) $M$.

1. Compute coordinate-wise probability distributions $p_i(\Delta) = \ddot{k}^i(\Delta)$.
2. Construct map as:

For $p = 1$ to $M$ do

Draw grid parameters $\delta, u \in \mathbb{R}^D$ with pitch $\delta^i \propto p_i$, and shift $u^i$ from uniform distribution on $[0, \delta^i]$.

Let $z$ return the coordinate of the bin containing $x$ as a binary indicator vector $z_p(x) \equiv$ hash $\left(\left\lceil \frac{x^1 - u^1}{\delta^1} \right\rceil, \ldots, \left\lceil \frac{x^D - u^D}{\delta^D} \right\rceil \right)$.

end for

3. Output final feature map as $$z(x) \equiv \frac{1}{\sqrt{M}} [z_1(x) \ldots z_M(x)].$$

FIG. 15

FEATURE EMBEDDINGS WITH RELATIVE LOCALITY FOR FAST PROFILING OF USERS ON STREAMING DATA

CROSS-REFERENCE TO RELATED APPLICATIONS

The present application claims priority to U.S. Provisional Patent Application No. 62/370,149, filed Aug. 2, 2016, the entire disclosure of which is hereby incorporated by reference.

BACKGROUND

There is a need to make decisions on data that changes quickly or even in real time. One such application is authentication or impostor detection where there may be a cost associated with the latency of decision-making. Conventionally, a large number of models are required to be built or modified each pertaining to the profile of a user without enrolling the user explicitly.

In explicit enrollment, the user consciously goes through a series of steps so as to help gather sufficient and highly accurate data to train the user's profile. One example of explicit enrollment is where the user speaks a series of keywords that help capture the user's acoustic features. Enrollment, as used herein, is often within the context of authentication or the context of impostor detection.

When explicit enrollment cannot be done, enrollment happens in incremental steps as and when more data is captured passively. For example, "passive enrollment" involves a user making a call or performing an activity without knowing about any enrollment that is happening.

A unique model or profile may be created for every user using existing data, and then the model may be continually improved as more data related to a particular user is streamed into the system. Another example is impostor detection where content related to users' activities is generated in large volumes, and quick anomaly detection schemes are required to generate timely alerts to indicate activity that is not genuine. Hence, there are two simultaneous challenges: a large volume of streaming data and a low-latency constraint. Traditional machine learning techniques are quite powerful in generating accurate models but may not be suitable in their original form for voluminous, streaming, and latency-constrained applications. This may be attributed to two main reasons, among others: learning complex decision boundaries and cross-validation to avoid overfitting, both of which are computationally expensive.

SUMMARY

This Summary introduces a selection of concepts in a simplified form to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

This disclosure pertains to methods of modeling user profiles trained on a large volume of streaming user-generated content from diverse sources. The user profiles may belong to genuine users or users that are not genuine.

The proposed method uses a relative locality measure in a transformed feature space to classify data without having to learn an explicit decision boundary. Training involves learning a feature space that provides a favorable relative locality measure (a kind of distance metric) of the class of interest. Eliminating the need to learn complex decision boundaries means that this method is more robust to overfitting than commonly used classifiers, and also, it is extremely fast for use in online learning.

Relative locality measure allows for comparisons across different feature spaces, including where comparing a Euclidean distance from a first feature space to a Euclidean distance from a second feature space may not be very informative. Relative locality measure of a point from a reference may be viewed as the percentage of uniform randomly chosen points that are closer to the reference (in terms of the Euclidean distances) than the given point.

In general, one aspect of the subject matter described in this specification can be embodied in a computer-implemented method operating on a dataset that includes data points of events of one or more users, the method comprising: selecting an approximate feature map from a plurality of approximate feature maps based on a relative locality measure of a cluster that includes at least two of the data points in the dataset, wherein the relative locality measure of the cluster is determined based on a Euclidean distance in a feature space generated by the selected approximate feature map.

These and other embodiments can optionally include one or more of the following features. In at least one embodiment, the computer-implemented method further comprises mapping the dataset using the selected approximate feature map.

In at least one embodiment the computer-implemented method further comprises classifying a new data point based on a relative locality measure of the new data point, wherein the relative locality measure of the new data point is determined based on a Euclidean distance in the feature space generated by the selected approximate feature map.

In at least one embodiment of the computer-implemented method, the classifying a new data point based on a relative locality measure of the new data point includes authenticating the new data point.

In at least one embodiment of the computer-implemented method, the classifying a new data point based on a relative locality measure of the new data point includes associating a fraud label with the new data point.

In at least one embodiment of the computer-implemented method, the new data point includes at least one of a phoneprint, information identifying a user, metadata associated with the caller ID, an intention of a user, a phone number, a voiceprint, information relating to ANI features, or a transaction request type.

In at least one embodiment of the computer-implemented method, the data points in the dataset are each classified in at least one class from a set of classes, and the classifying a new data point based on a relative locality measure of the new data point includes classifying the new data point in a class not included in the set of classes.

In at least one embodiment of the computer-implemented method, the classifying a new data point based on a relative locality measure of the new data point is based on a relative locality measure of the new data point with respect to a data point in a cluster.

In at least one embodiment of the computer-implemented method, the classifying a new data point based on a relative locality measure of the new data point is based on a relative locality measure of the new data point with respect to a centroid of a cluster.

In at least one embodiment of the computer-implemented method, coordinates of a centroid of a cluster including at least two of the data points in the dataset are stored in a memory device.

In at least one embodiment of the computer-implemented method, the relative locality measure of the cluster is determined using at least one of following: a relative locality measure of a data point in the cluster to a centroid of the cluster; or a relative locality measure of a data point in the cluster to another data point in the cluster.

In at least one embodiment, the computer-implemented method, the computer-implemented method of claim 1, further comprises: selecting an approximate feature map from the plurality of approximate feature maps based on following: a relative locality measure of a cluster that includes at least two of the data points in the dataset; and a subset of features included in at least one of the data points in the dataset.

In at least one embodiment of the computer-implemented method, the subset of features included in the at least one of the data points in the dataset is a subset of feature types.

In at least one embodiment of the computer-implemented method, the new data point is generated during a phone call and pertains to the phone call, the classifying the new data point based on a relative locality measure of the new data point is completed during the phone call, and a classification of the new data point is displayed on a display.

In at least one embodiment, the computer-implemented method further comprises determining the plurality of approximate feature maps.

In at least one embodiment of the computer-implemented method, the determining the plurality of approximate feature maps is done using at least one of a Nyström method, a random Fourier features approximation, or a random binning transform.

In at least one embodiment of the computer-implemented method, the cluster includes data points of events pertaining to at least two different users, and each of the data points in the cluster has a same classification.

In at least one embodiment of the computer-implemented method, the same classification of each of the data points in the cluster is a fraud classification.

In at least one embodiment, the computer-implemented method further comprises: assigning a classification to the new data point based on the relative locality measure of the new data point; and authenticating, based on the classification assigned to the new data point, a user during a phone call, wherein the new data point includes numerical features pertaining to the phone call.

In at least one embodiment of the computer-implemented method, the selected approximate feature map is an approximate kernel map.

In general, one aspect of the subject matter described in this specification can be embodied in a computer-implemented method of authenticating a user, the computer-implemented method comprising: mapping, using an approximate feature map, a new data point to a feature space, wherein the new data point includes numerical features pertaining to a phone call of the user; and authenticating, based on a relative locality measure of the new data point to a cluster mapped to the feature space, the user during the phone call, wherein the cluster includes data points of events of the user.

These and other embodiments can optionally include one or more of the following features. In at least one embodiment, the computer-implemented method of authenticating a user further comprises: authenticating, based on a relative locality measure of the new data point to a centroid of the cluster mapped to the feature space, the user during the phone call, wherein the new data point includes features of at least one of a phoneprint of the phone call or a voiceprint of the user, and wherein the centroid of the cluster is stored in a memory device.

In at least one embodiment, the computer-implemented method of authenticating a user further comprises: including the new data point in the cluster; determining a new centroid of the cluster after the new data point is included in the cluster; and storing the new centroid of the cluster in a memory device.

In at least one embodiment of the computer-implemented method of authenticating a user, the new centroid of the cluster is determined based on the coordinates in the feature space of all data points included in the cluster, and the approximate feature map is determined using at least one of a Nyström method, a random Fourier features approximation, or a random binning transform.

In general, one aspect of the subject matter described in this specification can be embodied in a system that authenticates a user, the system operating on a dataset that includes data points, each data point including features, the system comprising: at least one processor; a memory device coupled to the at least one processor having instructions stored thereon that, when executed by the at least one processor, cause the at least one processor to: select an approximate feature map from a plurality of approximate feature maps based on a relative locality measure of a cluster that includes at least two of the data points in the dataset; select a subset of features in each data point; map, to a feature space, the subset of features in each data point using the selected approximate feature map; map, to the feature space, features included in a new data point using the selected approximate feature map; determine a classification of the new data point based on a relative locality measure of the new data point with respect to a cluster in the feature space; and authenticate the user.

These and other embodiments can optionally include one or more of the following features. In at least one embodiment of the system that authenticates a user, the new data point pertains to a phone call of the user, the at least one processor is further caused to, responsive to the determination of the classification of the new data point, authenticate the user during the phone call, and the classification of the new data point is stored in a memory device.

In at least one embodiment of the system that authenticates a user, the at least one processor is further caused to determine the plurality of approximate feature maps.

In at least one embodiment of the system that authenticates a user, the relative locality measure of the cluster is determined based on a Euclidean distance in a feature space generated by the selected approximate feature map.

In general, one aspect of the subject matter described in this specification can be embodied in a computer-implemented method of denying authentication to a user, the method comprising: mapping, using an approximate feature map, a new data point to a feature space, wherein the new data point includes numerical features pertaining to a phone call of the user; and denying, based on a relative locality measure of the new data point to a cluster mapped to the feature space, authentication to the user during the phone call, wherein the cluster includes data points of non-genuine events of a plurality of users.

In general, one aspect of the subject matter described in this specification can be embodied in a computer-implemented method operating on a dataset that includes data points of events of one or more users, the method comprising: selecting a subset of features of data points included in the dataset from a set of features based on a relative locality measure of a cluster that includes at least two of the data points in the dataset, wherein the relative locality measure of the cluster is determined based on a Euclidean distance in a feature space generated by an approximate feature map.

These and other embodiments can optionally include one or more of the following features. In at least one embodiment of the computer-implemented method operating on a dataset that includes data points of events of one or more users, the method further comprises: selecting the approximate feature map from a plurality of approximate feature maps based on the relative locality measure of the cluster that includes at least two of the data points in the dataset.

In general, one aspect of the subject matter described in this specification can be embodied in a computer-implemented method operating on a dataset that includes data points of events of one or more users, the method comprising: mapping a data point in the dataset to a feature space using an approximate feature map; determining a relative locality measure of the mapped data point with respect to a cluster, wherein the relative locality measure of the mapped data point is determined based on a Euclidean distance in the feature space, and wherein the cluster includes data points having a same classification; and determining the mapped data point should not have the same classification as the data points having the same classification.

These and other embodiments can optionally include one or more of the following features. In at least one embodiment, the computer-implemented method further comprises: determining, based on a Euclidean distance in a feature space generated by a second approximate feature map, a second relative locality measure of the mapped data point with respect to a second cluster that includes data points having a second classification; and selecting the second approximate feature map from a plurality of approximate feature maps based on the second relative locality measure.

In at least one embodiment of the computer-implemented method, the mapped data point and the data points in the second cluster have the second classification.

In at least one embodiment, the computer-implemented method further comprises: determining, based on a Euclidean distance in a feature space generated by the second approximate feature map, a relative locality measure of a second data point with respect to the second cluster; determining the second data point would be misclassified if it were classified as the second classification; determining, based on a Euclidean distance in a feature space generated by a third approximate feature map, a second relative locality measure of the second data point with respect to a third cluster that includes data points having a third classification; and selecting the third approximate feature map from a plurality of approximate feature maps based on the second relative locality measure of the second data point.

In at least one embodiment, the computer-implemented method further comprises: determining, based on a Euclidean distance in a feature space generated by a second approximate feature map, a second relative locality measure of the mapped data point with respect to a second cluster that includes data points having a second classification; and selecting a subset of features of data points included in the dataset from a set of features based on the second relative locality measure of the mapped data point.

It should be noted that embodiments of some or all the processor and memory systems disclosed herein may also be configured to perform some or all the method embodiments disclosed above. In addition, embodiments of some or all the methods disclosed above may also be represented as instructions embodied on non-transitory computer-readable storage media such as optical or magnetic memory.

Further scope of applicability of the methods and systems of the present disclosure will become apparent from the Detailed Description given below. However, the Detailed Description and specific examples, while indicating embodiments of the methods and systems, are given by way of illustration only, since various changes and modifications within the spirit and scope of the concepts disclosed herein will become apparent to those having ordinary skill in the art from this Detailed Description.

BRIEF DESCRIPTION OF THE DRAWINGS

FIG. 4 includes four graphs illustrating the geometry of noisy features.

FIG. 7A is an example algorithm for offline tuning of feature selection and kernel selection (e.g. for user authentication) in at least one embodiment.

FIG. 7B is an example algorithm for determining a user-specific threshold for genuineness in at least one embodiment.

FIG. 8A is an example algorithm for offline tuning of feature selection and kernel selection (e.g. for fraud detection) in at least one embodiment.

FIG. 8B is an example algorithm for determining a threshold for non-genuineness in at least one embodiment.

FIG. 12A is an example linear perceptron algorithm.

FIG. 12B is an example kernel perceptron algorithm.

FIG. 12C is an example kernel perceptron algorithm.

FIG. 13 is an example algorithm that outputs an explicit kernel map using a Nyström method in at least one embodiment.

FIG. 14A is an example algorithm that computes a feature map using random Fourier features in at least one embodiment.

FIG. 14B is an example algorithm that computes a feature map using random Fourier features in at least one embodiment.

FIG. 15 is an example algorithm that computes a feature map using random binning features in at least one embodiment.

DETAILED DESCRIPTION

Figure 1:
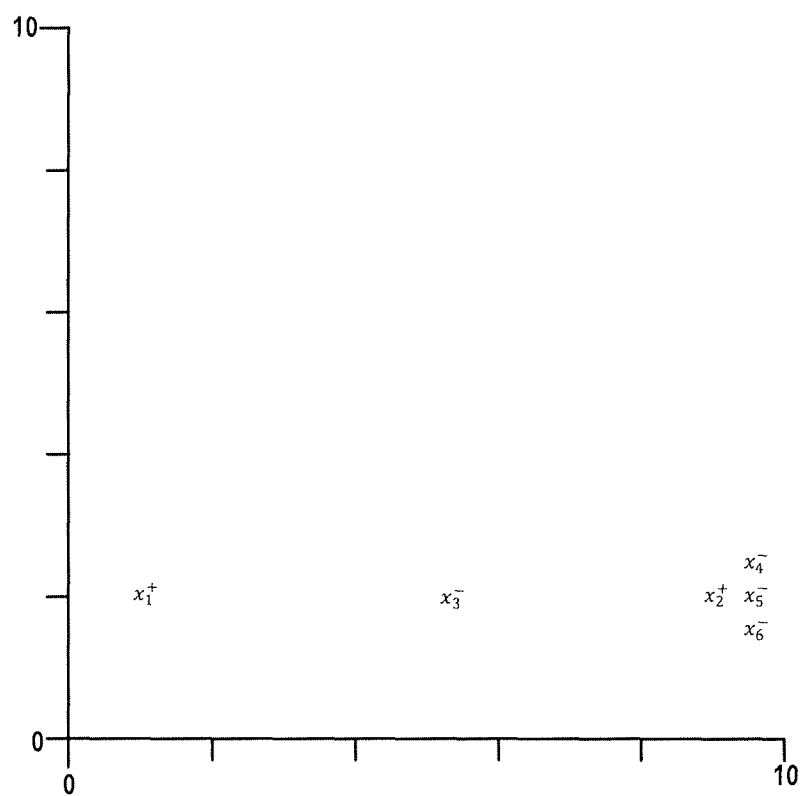
FIG. 1 is a toy example in $\mathbb{R}^2$ illustrating relative locality measures and classification according to at least one embodiment operating on example data.

The need for training complex decision boundaries can be eliminated by identifying a feature space that allows the data to be highly localized to a region in the feature space. Localization enables use of some appropriate measure of distance in the feature space to quickly estimate the measure of closeness or similarity of the test (unlabeled) data point. This technique can be used as a soft classification decision. The advantages of using this technique are multiple. It is fast as no decision boundary needs to be learned, and it also provides an intuition of the relative position of an unlabeled data point from a reference.

There are many different types of algorithms that construct feature spaces using mappings, including, but not limited to random projections, deep neural networks, random forests, and kernel methods. In most of these algorithms, the complex feature space is constructed in conjunction with the classifier, which tends to be a simple linear model: these simple models in the feature space, in turn, correspond to complex decision boundaries in the input space. In other words, if we can simply access the feature mapping alone, we can use localization to train efficient classifiers. This is different from simply using the aforementioned algorithms as is, since the simple linear models in feature space, e.g. the softmax classifier at the last layer of a deep neural network, or a linear SVM in the feature space generated from the kernel in kernel SVMs, while efficient for a small number of classes, can become too computationally intensive for a large number of classes, and cannot accommodate missing data. While any of the aforementioned feature maps may be used to explore locality in a transformed feature space, kernel methods represent a good option for this task since the feature map is constructed utilizing properties of positive-definite functions known as kernels that, in particular, enjoy data smoothing properties and can be approximated extremely efficiently. For the rest of this document, we use kernel approximation as our canonical example of a feature map.

Consider a classification problem where each class corresponds to a user or an impostor (e.g., a fraudster). The cardinality of classes is dynamic in that the cardinality generally increases with time. The data pertaining to user activity (e.g., phoneprint features from calls, voice biometric features, transaction data, logs from online activity, etc.) is constantly being captured. This is also the same for a non-genuine or malicious user such as a fraudster. Interesting features (in some embodiments, numerical features) are extracted from the content with the intention of profiling both genuine and non-genuine users to detect malicious activity and identify compromised user accounts. These profiles can be created using one of the many commonly used classifiers. However, commonly used classifiers pose some challenges when used in such a scenario. Many are not suitable for online data, and even if they are, they do not scale well with the volume of data or cannot satisfy low-latency constraints. For example, training a SVM for every user in the system would be computationally expensive. Moreover, in order to avoid overfitting, some cross-validation methods are required to choose hyperparameters. Hence sparse data becomes even sparser when it is divided between parts and folds.

Feature data can possess latent structural properties, which can be exploited using mappings for classification purposes. Features are desired to be accurate representations of the properties of interest that help distinguish between classes. Finding a coordinate space for feature representation that separates the classes of interest may not be straightforward and sometimes not possible if we are unaware of feature causality with classes. Different classifiers can construct feature mappings with varying success: for example, classifiers such as deep neural networks may work with raw feature data and learn high-level abstractions representing latent properties of interest from numerical feature data, although they typically require large amounts of labeled data to train the mappings and tend to be computationally very expensive. Hence, learning a suitable feature embedding is highly helpful in most applications.

Diverse user-generated content (for example phoneprint, voiceprint features, ANI (automatic number identification) information, user activities, etc.) may form a feature space representation. The diverse nature of the data means distances and relative positions of points in this aggregate feature space of widely disparate and possibly noisy data sources may not always be informative. A suitable machine learning algorithm is needed that is able to learn the latent properties and the structure of the underlying data. Kernel machines are intended to do this job for the purpose of making data linearly separable. Dissimilarity-based measures have been explored in the past, but they are not suitable for fast classification. Kernel functions without explicit embeddings are limited to pairwise comparison and are not suitable for use with relative locality measure. To see why this is the case, it is instructive to give an outline of classical kernel methods.

Kernel Methods

Feature spaces produced by explicit kernel maps support Euclidean distance measurements. In a sense, explicit kernel maps are explicit in that they express a coordinate space. An explicit kernel map provides a transformation function that converts D-dimensional feature vectors to M-dimensional feature vectors, where M is not necessarily equal to D. An implicit kernel map may provide a function that maps two data points in a dataset to a scalar value. A difficulty with explicit maps is determining how to construct them from scratch without domain specific information. This is the problem kernel methods sought to solve; kernels map features implicitly by encoding the correlation between data vectors in the input space using a kernel function. Classically, a kernel function is a symmetric and positive-definite function of two data points x, y∈Ω, where Ω is an input domain. Any such function ensures the existence of a feature map ψ to feature space $\mathcal{H}$, which has the property $k(x, y) = \langle ψ(x), ψ(y) \rangle_{\mathcal{H}}$, which means that the kernel measures the inner product between two mapped vectors. Since the inner product for real-valued vector spaces is symmetric and linear in both arguments, kernels can be used to create nonlinear algorithms from linear algorithms without having any access to the feature map i.e. using the feature map implicitly. A canonical example of this for classification is the perceptron algorithm. In the linear perceptron algorithm, one is given data with N data points as $\mathcal{X} = \{x_1, \ldots, x_N\}$, with labels $y_i \in \{-1, +1\}$, and the goal is to learn a linear decision boundary $f(x) = \langle x, y \rangle_{\mathbb{R}^D} + b$ that generates a prediction of the class of the data. This can be accomplished using Algorithm 1, which is reproduced as FIG. 12A.

Algorithm 1 Linear Perceptron Algorithm
Input: Input data $\mathcal{D} = \{(x_1, y_1), \ldots, (x_N, y_N)\}$.
1. Initialize w:=0 in $\mathbb{R}^D$.
2. Perform the following:
  while $f(x_i) \neq y_i$ for any point $(x_i, y_i)$ do
    If $y_i(\langle w, x_i \rangle_{\mathbb{R}^D} + b) < 0$, then $w \leftarrow w + y_i x_i$ and $b := b + y_i$.
end while If the data is linearly separable, this will generate a linear boundary. To generate a kernelized version of this algorithm, one can use the following trick. First, suppose one had access to the feature map ψ(x), and assume without loss of generality that the bias term b is encoded into the kernel. Then the nonlinear version of the perceptron algorithm would become Algorithm 2, which is reproduced as FIG. 12B.

Algorithm 2 Kernel Perceptron Algorithm 1
Input: Input data $\mathcal{D} = \{(x_1, y_1), \ldots, (x_N, y_N)\}$.
1. Initialize w:=0 in $\mathcal{H}$.
2. Perform the following:
  while $f(x_i) \neq y_i$ for any point $(x_i, y_i)$ do
    If $y_i(\langle w, ψ(x_i) \rangle_{\mathcal{H}}) < 0$, then $w \leftarrow w + y_i ψ(x_i)$.
end while Note that here, the vector w lives in the implicit feature space $\mathcal{H}$. Now, since the perceptron's weight vectors are always computed as sums over the mapped data, due to the update equation $w \leftarrow w + y_i ψ(x_i)$, the weight vector can be written as $w = \sum_{i=1}^{N} φ_i ψ(x_i)$, where $φ_i = y_i$ if the classification is correct, and zero otherwise. Since the target function is $f(x) = \langle w, ψ(x) \rangle_{\mathcal{H}}$, we get $$f(x) = \left\langle \left( \sum_{i=1}^{N} φ_i ψ(x_i) \right), ψ(x) \right\rangle_{\mathcal{H}}$$

$$= \sum_{i=1}^{N} φ_i \langle ψ(x_i), ψ(x) \rangle_{\mathcal{H}}$$

$$= \sum_{i=1}^{N} φ_i k(x_i, x),$$

from the properties of the inner product and the kernel. Since the function can be expressed solely in terms of the kernel inner products, we can formulate a new version of the kernel perceptron as in Algorithm 3, which is reproduced as FIG. 12C. Here, each datapoint $x_i$ will get its own weight $\gamma_i$, leading to the algorithm.

Algorithm 3 Kernel Perceptron Algorithm 2
Input: Input data $\mathcal{D} = \{(x_1, y_1), \ldots, (x_N, y_N)\}$.
1. Initialize w:=0 in $\mathcal{H}$.
2. Perform the following:
  while $f(x_i) \neq y_i$ for any point $(x_i, y_i)$ do
    If $y_i(\langle w, ψ(x_i) \rangle_{\mathcal{H}}) < 0$, then $\gamma_i \leftarrow \gamma_i + y_i$.
end while Working solely in terms of the kernel products on the data rather than explicitly in the feature space $\mathcal{H}$ is known as the "kernel trick", and it can be utilized in all kernel-based methods, including but not limited to support vector machines, kernel PCA, and Gaussian process regression, among others. The kernel trick approach is helpful in cases when the feature space generated by the kernel is infinite-dimensional, as in the case of the RBF kernel, but even the dual approach becomes computationally infeasible for large amounts of data. This computational burden will be examined further in the section on approximate kernel maps. Thus explicit feature maps associated with a kernel (hereinafter referred to as "explicit kernel maps") are desirable, when they can be computed efficiently.

Hence, explicit kernel maps are desirable to characterize a group of points and a region in the feature space. For example, a centroid for a group of points cannot be computed in closed form if an explicit feature map does not exist for the kernel function.

It is easy to confuse this problem with that addressed by locality-sensitive hashing, but there are some important differences. While locality-sensitive hashing addresses the problem of querying high-dimensional data to find nearest neighbors, in the problem aspects of this disclosure addresses, the labels (e.g. usernames) are already known. What is of interest is whether a data point or feature vector "agrees" with the profile of a user that the label claims to be.

This disclosure introduces relative locality as a dissimilarity measure. This measure may be used to evaluate the "locality-worthiness" of a feature space for a particular dataset. Hence an aspect is to select a feature space which maximizes, or approximately maximizes, locality.

The dataset consists of instances or data points where each instance or data point is a representation of a user event. The activity in an illustrative application is a phone call made by a user. The data point may include features related to call provenance, voice of the caller, metadata associated with the caller ID (phone number), and possibly the intention of the caller. Multiple events for the same user can be linked by the account number. A system captures live data and stores it in a repository. A profile for each user is trained using all the data points that can be attributed to the user. The idea is that by comparing future events (data points) with the profile of the user, anomalies may be identified. An example of an anomaly could be a fraudster pretending to be the user. A dual way of looking at this is as follows: can a profile be created for each fraudster so that future calls may be matched with the profile for each fraudster.

Relative Locality Measure

Locality can generally be defined as a region or neighborhood in a feature space attributed to points with a similar property or properties of interest. There can be different measures of locality, and the degree of locality of points may be defined in many different ways. For example, the Euclidean distance between points in the region where locality must be defined may be measured. However, if we need to decide whether a new point outside this region should be included in the set, we need to select a threshold, and the Euclidean distance measure does not allow the setting of a global threshold that easily decides such a membership issue. In a kernel space (for example, in the space generated by the radial basis function kernel), it is possible to set a global threshold that decides such membership because the maximum distance between two points is 1, and the minimum distance is 0. However, different kernels may generate very poor localization. Therefore, we need a measure of locality that allows us to select between different kernel maps, because our goal is to select the feature space where this locality is maximized.

This disclosure sets forth a new measure of distance that is more informative in terms of measuring the locality-worthiness of a kernel: relative locality measure. Relative locality measure indicates the distance of one point from at least one other point. In at least one embodiment, the relative locality measure is a method of measuring the utility of a kernel, approximate feature map, or feature space by using distances from points belonging to a cluster or common class to points in a random sample, independent of the class or classes to which the points in the random sample belong, as a way of measuring the locality of points belonging to the cluster or common class.

In at least one embodiment, the relative locality measure of a point $x_i$ from a point $x_j$ is defined in terms of a set of M uniformly randomly chosen points from the dataset $\mathcal{X} = \{x^1, \ldots, x_N\}$, $x_k \in \mathbb{R}^D$, of N points. Specifically, let $\Omega = \{y_1, \ldots, y_M\}$ be the set of M<N randomly chosen points. Let $d(x_i, x_j) = \|x_i - x_j\|_{\mathbb{R}^D}$ be the Euclidean distance between $x_i$ and $x_j$. The relative locality measure of $x_i$ from $x_j$ is defined as follows. Let $$\mathcal{D}(x_i, x_j) := \frac{1}{M} |S|, \quad (1)$$

where $$S := \{y_k \text{ such that } d(y_k, x_j) < d(x_i, x_j)\} \quad (2)$$

and where the operator $|\cdot|$ denotes the cardinality of a set. Put simply, this is the fraction of points in the set $\Omega$ with distance $d(\cdot, \cdot)$ from $x_j$ less than that of $x_i$ from $x_j$. This definition of relative locality measure involves measurement of how close point $x_i$ is to point $x_j$ compared to other points. Relative locality measure may be used to estimate a fraction of points that are closer than $x_i$ to $x_j$.

In at least one embodiment, relative locality measure may be used to estimate a false acceptance rate. For example, assume the set $\Omega$ is randomly chosen only from a uniform distribution of points not in the same class as $x_j$. Then, if $x_i$ is classified as the same class as $x_j$, the relative locality measure of $x_i$ from $x_j$ estimates the fraction of points in $\Omega$ that would be falsely accepted as being of the same class as $x_i$ and $x_j$ if any point closer than $x_i$ to $x_j$ were re-classified as the same class as $x_j$. This measure is asymmetric like other measures including the Kullback-Liebler divergence $D_{KL}$, in that generally $D_{KL}(P\|Q) \neq D_{KL}(Q\|P)$. In other words, $\mathcal{D}(x_i, x_j)$ generally is not equal to $\mathcal{D}(x_j, x_i)$, and whether $\mathcal{D}(x_i, x_j)$ is equal to $\mathcal{D}(x_j, x_i)$ depends on the dataset and possibly also the feature space.

FIG. 1 is a toy example in $\mathbb{R}^2$ illustrating relative locality measures and classification according to at least one embodiment operating on example data. In FIG. 1, let $\mathcal{X} = \{x_1^+, x_2^+, x_3^-, x_4^-, x_5^-, x_6^-\}$, $x_k \in \mathbb{R}^2$, and $\Omega = \{x_3^-, x_4^-, x_5^-, x_6^-\}$, where $x_p^+ \in \mathcal{C}^+$, $\forall p$, and $x_q^- \in \mathcal{C}^-$, $\forall q$, and $\mathcal{C}^+ \cap \mathcal{C}^- = \emptyset$. From the graph in FIG. 1, $$\mathcal{D}(x_1^+, x_2^+) = 1 \text{ and } \mathcal{D}(x_2^+, x_1^+) = \frac{1}{4}.$$

Then, if $x_1^+$ is classified as being in the same class as $x_2^+$, and if any point closer than $x_1^+$ to $x_2^+$ is re-classified as being in the same class as $x_2^+$, all points in $\Omega$ will be incorrectly classified. Likewise, if $x_2^+$ is classified as being in the same class as $x_1^+$, and if any point closer than $x_2^+$ to $x_2^+$ is re-classified as being in the same class as $x_1^+$, 25% of points in $\Omega$ will be incorrectly classified. (Note that, here, $\Omega$ included all points not in the same class as $x_1^+$ and $x_2^+$.)

Dually, relative locality measure may implicitly define the receiver operating characteristic and equal error rate of a feature space. For example, in at least one embodiment, the relative locality measure of a point from a cluster centroid may be used to determine the false acceptance rate if that point were considered part of the cluster and if all points closer to the cluster centroid than that point were classified as the same classification of the points in the cluster.

There are various ways of using relative locality measure to assess the locality-worthiness of a kernel, approximate feature map, or feature space. Further, relative locality measure may be used for instances or data points having multiple classifications. That is, $\mathcal{D}(x_i, x_j)$ may have different values if a restriction is placed on $\Omega$. For example, in at least one embodiment, the locality-worthiness of a kernel, approximate feature map, or feature space may be assessed with respect to different classifications $\mathcal{C}_1, \mathcal{C}_2, \ldots, \mathcal{C}_\sigma$ by calculating $\mathcal{D}_1(x_i, x_j)$, wherein $\Omega$ is restricted to data points in $\mathcal{C}_1$, by calculating $\mathcal{D}_2(x_i, x_j)$, wherein $\Omega$ is restricted to data points in $\mathcal{C}_2$, etc., up to and including $\mathcal{D}_\sigma(x_i, x_j)$, wherein $\Omega$ is restricted to data points in $\mathcal{C}_\sigma$. Note $x_i$ could be a centroid of a cluster or a data point/instance in the dataset. Then, because the classifications $\mathcal{C}_1, \mathcal{C}_2, \ldots, \mathcal{C}_\sigma$ are not necessarily mutually disjoint, $$\sum_{l=1}^{\sigma} \mathcal{D}_l(x_i, x_j) \times |\mathcal{C}_l| \quad (3)$$

yields a number of incorrect classifications for points, which, depending on the dataset, may be distinct from a number of data points misclassified.

Relative locality measure of a cluster could be calculated by, for example, summing the relative locality measure for each data point i with respect to each data point j in the cluster, taking care to include both $\mathcal{D}(x_i, x_j)$ and $\mathcal{D}(x_j, x_i)$, and then dividing the sum by one less than the cardinality of the cluster.

Relative locality measure for a cluster could be calculated by, as another example, determining the relative locality measure of each data point in the cluster with respect to the cluster's centroid and then averaging said relative locality measures.

In another example, relative locality measure of a cluster could be determined by determining a list comprising the relative locality measure of each data point in the cluster with respect to the cluster's centroid and then setting the relative locality measure of the cluster to the relative locality measure in the list having the highest magnitude.

In yet another example, relative locality measure of a cluster may be a relative locality measure of a data point in the cluster to a centroid of the cluster. Further, a relative locality measure of a cluster may be a relative locality measure of a data point in the cluster to another data point in the cluster.

Space Transformations

Figure 2:
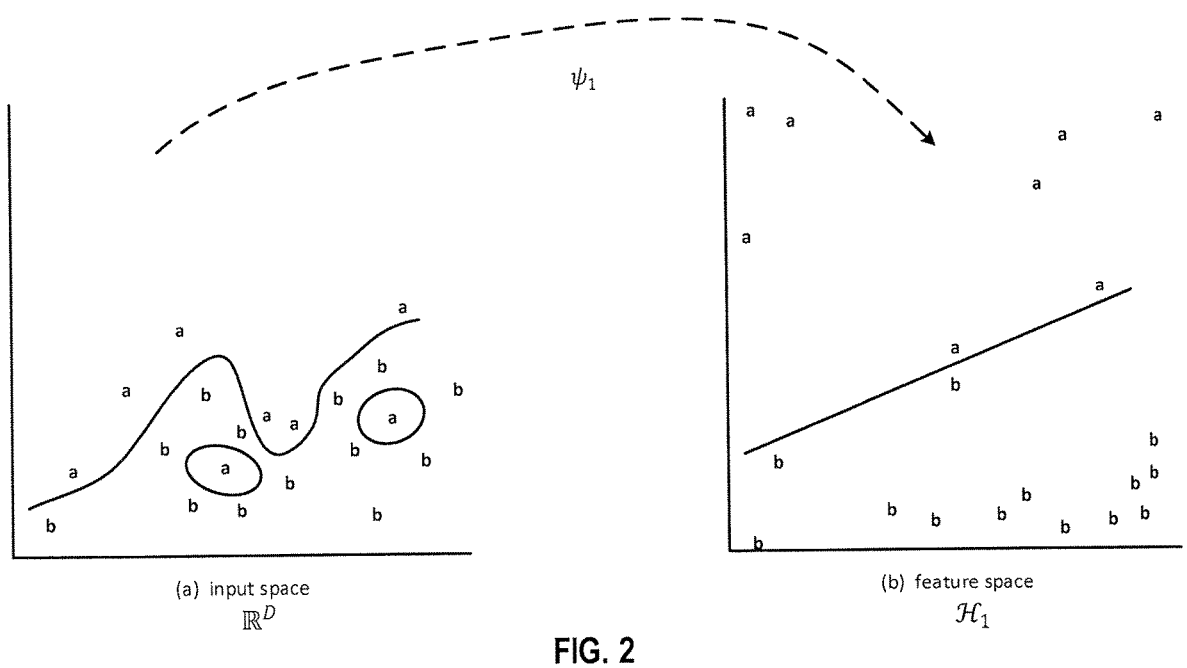
FIG. 2 illustrates a space transformation enabling use of a linear classifier.

FIG. 2 illustrates a space transformation enabling use of a linear classifier. In the input space $\mathbb{R}^D$, data points a and data points b are interspersed. A kernel map $\psi_1$ maps the data points in input space to a feature space In the feature space $\mathcal{H}_1$, a linear classifier may be defined. A SVM could be used resulting in the decision boundary depicted. However, as discussed herein, a SVM may have disadvantages including overfitting and the need for cross-validation, as well as the computational complexity involved in training a SVM for each user.

Consider a situation where all data points a in the feature space of FIG. 2 were clustered into a cluster $\mathcal{C}_a$ having a centroid $c_a$, and all data points b in the feature space of FIG. 2 were clustered into a cluster $\mathcal{C}_b$ having a centroid $c_b$. Note kernel map $O_1$ mapped four data points "close" to a decision boundary. If a new data point is classified by a clustering method on the basis of its Euclidean distance from the centroid, it may be misclassified given the tendency of kernel map $\psi_1$ to map points close to the decision boundary (and hence close to equidistant from both centroid $c_a$ and centroid $c_b$ which were defined on a training set the cardinality of which becomes smaller relative to the number of all data points as new data points are admitted). Further, depending on how $\psi_1$ is defined, $\mathcal{H}_1$ could have infinite dimensions, rendering moot the concept of a centroid.

Figure 3:
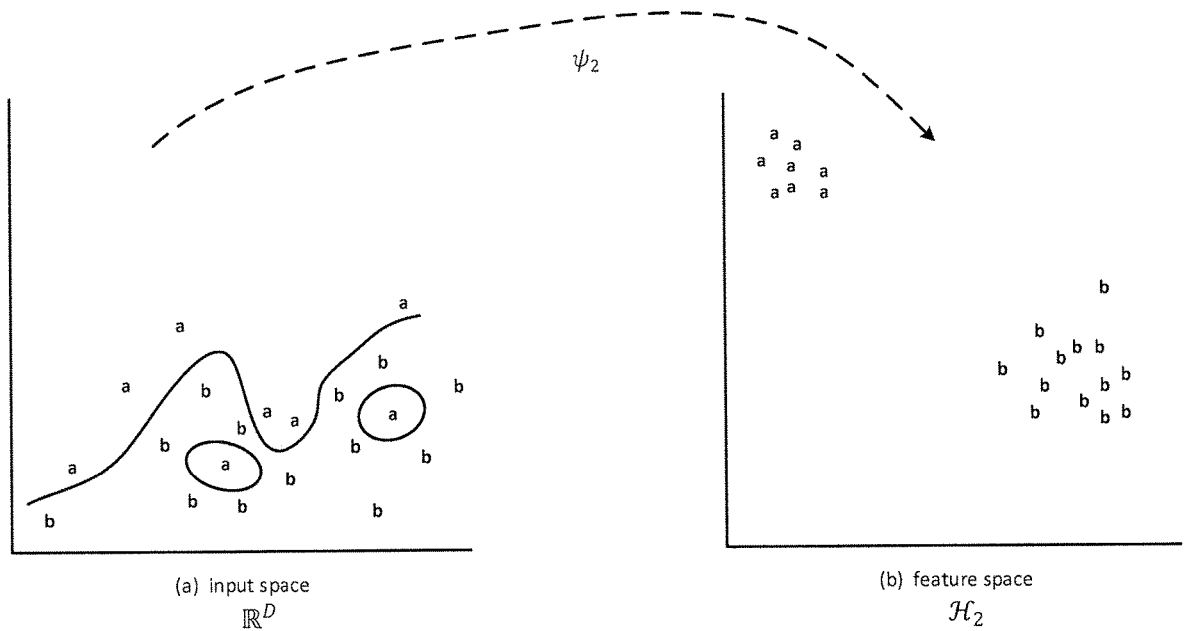
FIG. 3 illustrates a space transformation resulting in good locality according to at least one embodiment operating on example data.

FIG. 3 illustrates a space transformation resulting in good locality according to at least one embodiment operating on example data. The input space and data points in FIG. 3 are the same as the input space and data points in FIG. 2. Clearly, classification based on Euclidean distance from a cluster centroid in the input space $\mathbb{R}^D$ would be unreliable. Kernel map $\psi_2$ yields a feature space $\mathcal{H}_2$ with good locality for this dataset. There is reason to believe a new data point a and a new data point b would both be classified correctly if mapped by kernel map $\psi_2$ to feature space $\mathcal{H}_2$ and classified based on distance from cluster centroid.

In at least one embodiment, features may be normalized before using a kernel or an explicit kernel map or an approximate kernel map.

Explicit Kernel Maps

Feature spaces produced by explicit kernel maps support Euclidean distance measurements. In a sense, explicit kernel maps are "explicit" in that they "express" a coordinate space. An explicit kernel map provides a transformation function that converts an M-dimensional feature vectors to N-dimensional feature vectors, where M is not necessarily equal to N. Explicit feature maps exist for many machine learning algorithms, and note that it is possible to convert some of the implicit feature maps generated by kernel methods to an explicit feature map as well. In general, however, this is a very difficult task. In particular, as stated before, the feature map generated by the RBF kernel is infinite-dimensional, and therefore an explicit representation cannot be constructed for implementation.

Without limitation, the following relative locality measures may be calculated in feature spaces produced by certain feature maps, including explicit kernel maps or approximate feature maps: (a) a relative locality measure between two points in a dataset, (b) a relative locality measure between a centroid of a cluster and a point in a dataset, (c) a relative locality measure between a centroid of a first cluster and a centroid of a second cluster, and (d) a relative locality measure of a cluster.

Explicit kernel maps may be used to improve relative locality of the data. Kernels are useful to learn the structural properties of the data and may be used to map the data to a feature space different from the input space using, for example, a nonlinear function. Kernels are often used with SVMs that learn a linear decision boundary using support vectors (support data points) that "support" a hyperplane. Using kernels allows SVMs to learn support vectors that can support boundaries that are nonlinear in the input space (more than just hyperplanes).

In at least one embodiment, explicit kernel maps are used to transform the feature space to one where the structural embeddings are arranged so that locality is maximized or approximately maximized. It has been observed empirically that certain kernel transformations improve the locality of points belonging to the class(es) of interest. Kernels used with SVMs are prone to overfitting because of possibly unlimited degrees of freedom allowed for the shape of the decision boundary. This means that any data can be separated by using the right combination of parameters and learning intricate decision curves. The proposed method is robust to overfitting since no decision boundary need be learned. A kernel is used simply to produce an embedding that better reflects the structure of the underlying data.

Approximate Kernel Maps

As stated before, the central equation in the kernel methods literature is $$k(x,y)=\langle \psi(x),\psi(y)\rangle_{\mathcal{H}}, \qquad (4)$$

where $k:\Omega\times\Omega\to\mathbb{R}$ is a symmetric, positive definite kernel function, $\Omega$ is the input domain, $\mathcal{H}$ is the feature space, and $\psi:\Omega\to\mathcal{H}$ is the aforementioned feature map. As shown before, this feature map does not need to be known, and therefore is sometimes called the implicit feature map. Each point $f\in\mathcal{H}$ is a function $f:\Omega\to\mathbb{R}$. Kernel methods as defined classically operate in terms of kernel computations between the data. Suppose the data is given as $\mathcal{X} = \{x_1, \ldots, x_N\}$, $x\in\mathbb{R}^D$. For many methods such as kernel PCA, kernel ICA, and kernel least-squares regression, a naive implementation requires the computation of the Gram matrix $K\in\mathbb{R}^{N\times N}$, which is defined as $K_{ij}:=k(x_i, x_j)$. After the kernel matrix is computed, matrix operations can be performed that lead to nonlinear versions of the linear algorithms mentioned (in this case PCA, ICA, and regression). The issue here is that computing the Gram matrix takes $\mathcal{O}(DN^2)$ operations, and requires $\mathcal{O}(N^2)$ space in memory.

Modern datasets consist of hundreds of thousands of points in potentially hundreds or thousands of dimensions. Let N=100,000 and let D=100. Then computing the Gram matrix takes one trillion operations, and storing it in memory takes $10^{10}$ floating point numbers, which requires 74.51 GB to store. At the time of this writing, computer systems tend not to have this much RAM, so such approaches become untenable without approximation. Further, even the most successful of the kernel methods, the support vector machine algorithm, can take up to $\mathcal{O}(N^2)$ computations in the worst case, and can require as many as $\mathcal{O}(N)$ computations per query, which may be extremely slow, especially considering some institutions have millions of users.

The best way to free kernel methods from relying on the entire dataset $\mathcal{X}$ is to construct an approximation to the implicit feature map $\psi(x)$, hereinafter known as an "explicit feature map". There are different ways to approximate this feature map, two prominent examples of which are detailed below. The first example (Nyström method) is a form of spectral method, which relies on a subsample $\mathcal{C} = (c_1, \ldots,$ $c_M$) from the training data $\mathcal{X} = \{x_1, \ldots, x_N\}$, where $M \ll N$. The second example (random features) does not require a subsample from the training data and can be more efficient to compute.

Nyström Method

The feature map can be approximated using the eigenfunctions of the kernel, as detailed in C.K.I. Williams et al., Using the Nyström method to speed up kernel machines, in *Neural Information Processing Systems*, pages 682-688, 2001. More precisely, Mercer's theorem states that the kernel function can be expanded as $$k(x, y) = \sum_{i=1}^{\infty} \lambda_i \phi_i(x) \phi_i(y), \quad (5)$$

where $\lambda_i \in \mathbb{R}$ are the eigenvalues of the kernel, and the functions $\phi_i : \Omega \to \mathbb{R}$ are the eigenfunctions of the kernel. If these quantities have been computed, the explicit feature map generated from the kernel is given by $$\psi(x) := [\sqrt{\lambda_1} \phi_1(x) \sqrt{\lambda_2} \phi_2(x) \ldots \sqrt{\lambda_F} \phi_F(x)], \quad (6)$$

where F is the chosen order of the expansion. Approximations to these quantities can be computed, but require a sampling of the data. Suppose $\mathcal{C} = \{c_1, \ldots, c_M\}$ is sampled from the data. Then, one can compute the Gram matrix $K \in \mathbb{R}^{M \times M}$, where $K_{ij} := k(x_i, x_j)$. The matrix is diagonalized (i.e. its eigenvalues and eigenvectors are computed) as $$K = U \Lambda U^T, \quad (7)$$

where $U \in \mathbb{R}^{M \times M}$ is the matrix of eigenvectors, and $\Lambda \in \mathbb{R}^{M \times M}$ is a diagonal matrix of eigenvalues. The approximation to the feature map is given by the following Algorithm 4, which is reproduced as FIG. 13.

Algorithm 4 Nyström Algorithm.

Input: Kernel k, data $\mathcal{X} = \{x_1, \ldots, x_N\}$, $x_i \in \mathbb{R}^D$, chosen size of subset M, and chosen size of eigenvalue expansion F.
1. Sample subset $\mathcal{C} = \{c_1, \ldots, c_M\}$ from $\mathcal{X}$, and compute Gram matrix K.
2. Compute eigendecomposition $K = U \Lambda U^T$.
3. Given a new data point x, compute kernel vector $$k_x = [k(c_1, x) k(c_2, x) \ldots k(c_F, x)], \quad (8)$$

so that $k_x \in \mathbb{R}^F$.
4. Compute explicit kernel map $$\hat{\psi}(x) := \frac{1}{\sqrt{M}} [\sqrt{\lambda_1} U^{(1)T} k_x \sqrt{\lambda_2} U^{(2)T} k_x \ldots \sqrt{\lambda_F} U^{(F)T} k_x], \quad (9)$$

where $U^{(j)}$ is the jth column of the eigenvector matrix U.

Going back to our example of a dataset with N=100,000 and D=100, if we pick the number of basis functions M=1,000, and let F=100, the training time of the Nyström method is dominated by the $\mathcal{O}(M^2 F)$ operations required to diagonalize the Gram matrix, which in this case requires $10^8$ operations (100 million) versus the full method's $10^{12}$ (1 trillion). Put another way, this method is 10,000 times faster than the full method. Further, it requires retaining only an $\mathcal{O}(MF)$ matrix in memory, which consumes only 0.76 MB versus 74.51 GB for the full method.

Random Features

Instead of approximating the kernel's eigenfunctions using the Nyström method, the feature map can be approximated directly using random features, as outlined in Rahimi et al., Random features for large-scale kernel machines, in *Neural Information Processing Systems*, pages 1177-1184, 2007.

Random Fourier Features

For shift-invariant kernels $k(x, x') = k(x-x')$, a simple approximation called Random Fourier Features (RFF) can be created. The following classical theorem from harmonic analysis can be utilized for the map.

Theorem 1. (Bochner) A continuous kernel $k(x, x') = k(x-x')$ on $\mathbb{R}^D$ is positive definite if and only if $k(\delta)$ is the Fourier transform of a probability distribution.

Put another way, if $k(\delta)$ is scaled properly, Bochner's theorem guarantees that its Fourier transform $p(\omega)$ is a proper probability distribution. Therefore, $$k(x,x') = \int e^{i\omega^T(x-x')} \mathbb{R}^D p(\omega) d\omega. \quad (10)$$

This definition immediately suggests the creation of an explicit approximation to the nonlinear map to a high-dimensional feature space: assume $p(\omega)$ such that $\|p\|_{L^2} = 1$ and $p(\omega) = p(-\omega)$ to ensure that the imaginary part vanishes. Take a random sample from $[\omega_1, \omega_2, \ldots, \omega_M] \sim p(\omega)$ such that $\omega_i \in \mathbb{R}^D$. This allows us to derive the map $$k(x, x') = \int p(\omega) e^{i\omega^T(x-x')} d\omega$$

$$= \int p(\omega) e^{i\omega^T x} e^{-i\omega^T x'} d\omega.$$

Plugging in the random sample from above $\{\omega_j\}_{j=1}^M$, we get the approximation $$k(x, x') = \int p(\omega) e^{i\omega^T x} e^{-i\omega^T x'} d\omega$$

$$\approx \frac{1}{M} \sum_{j=1}^{M} e^{i\omega_j^T x} e^{-i\omega_j^T x'}$$

$$\approx \mathbb{E}_{p(\omega)} \langle \hat{\psi}(x), \hat{\psi}(x') \rangle_{\mathbb{R}^D},$$

where $\hat{\psi}(x) := \frac{1}{\sqrt{M}} [e^{i\omega_1^T x} e^{i\omega_2^T x} \ldots e^{i\omega_M^T x}]$.

Many popular shift-invariant kernels have closed form density solutions, as seen in Table 1 below. The most widely-used kernel is the RBF kernel, which has the Fourier pair $$e^{-\alpha \|x-x'\|_2^2} \leftrightarrow \frac{1}{\sqrt{\alpha}} e^{-\frac{\alpha \|\omega-\omega'\|_2^2}{\alpha}}. \quad (11)$$

Note that in the above map, the dimension M of the feature map is independent of the input data. In other words, the feature map can be constructed before a single point of data has been seen. Therefore this approach is fundamentally different from the Nyström method, which requires an input set of data $\mathcal{X} = \{x_i\}_{i=1}^N$ to compute the approximate feature map. All that the RFF approach needs is the dimension D of the input data.

TABLE 1

Closed form solutions for some shift-invariant kernels.

| Kernel name | k (Δ) | P(ω) |
|---|---|---|
| RBF | $e^{-\frac{\|\Delta\|_2^2}{2}}$ | $(2\pi)^{-\frac{D}{2}} e^{-\frac{\|\omega\|_2^2}{2}}$ |
| Laplacian | $e^{-\|\Delta\|_1}$ | $\prod_d \frac{1}{\pi(1+\omega_d^2)}$ |
| Cauchy | $\prod_d \frac{2}{1+\Delta_d^2}$ | $e^{-\|\omega\|_1}$ |

To summarize the above discussion, the approximation algorithm can be given as the following Algorithm 5, which is reproduced as FIG. 14A.

Algorithm 5 Generic RFF Algorithm.
Input: Shift-invariant kernel k with parameters γ and point $x \in \mathbb{R}^D$.
1. Compute Fourier transform of kernel: p(ω).
2. Sample set of frequencies $\{\omega_1, \omega_2, \ldots, \omega_M\} \sim p(\omega)$.
3. Compute feature map $$\hat{\psi}(x) := \frac{1}{\sqrt{M}}\left[e^{i\omega_1^T x} e^{i\omega_2^T x} \ldots e^{i\omega_M^T x}\right]. \quad (12)$$

A more concrete example is the approximation of the RBF kernel, which is given in Algorithm 6 and reproduced as FIG. 14B.

Algorithm 6 RFF algorithm for RBF kernel.
Input: RBF kernel k with parameter γ and point $x \in \mathbb{R}^D$.
1. Compute random matrix $\Psi \in \mathbb{R}^{M \times D}$ where each entry is sampled from unit-norm Gaussian distribution $\mathcal{N}(0,1)$.
2. Scale random matrix as $$\Psi \to \frac{1}{\gamma}\Psi.$$

3. Given input data point x, the feature map is given by $$\hat{\psi}(x) := \frac{1}{\sqrt{M}}\begin{bmatrix}\sin(\Psi x)\\-\cos(\Psi x)\end{bmatrix}. \quad (13)$$

Going back to our example of a dataset with N=100,000 and D=100, if we pick the number of basis functions M=1,000 the "training" time of the Nyström method includes only the time to generate the random matrix Ψ, which has $\mathcal{O}(MD)$ operations, which in this case requires $10^7$ operations (10 million) versus the full method's $10^{12}$ (1 trillion). Therefore, RFF is 100,000 times faster than the full method. Further, RFF requires retaining only a $\mathcal{O}(MD)$ matrix in memory, which consumes only 1.5 MB versus 74.51 GB for the full method. RFF consumes twice the memory as the Nyström example because of the sine and cosine parts of the matrix.

Random Binning Features (BinF)

The idea behind random binning features is to utilize random partitions (grids) in the input space and construct binary bit strings based on which bin in each dimension the input data falls into. The grids are constructed to ensure the probability that two points x, y are assigned to the same bin is proportional to k(x, y). This algorithm is designed to work with kernels that depend on the $L_1$ distance between two points x, y (i.e. $|x^i-y^i|$) and whose second derivative $\ddot{k}^i$ is a probability distribution in each dimension. The algorithm for this is given below as Algorithm 7 and reproduced as FIG. 15.

Algorithm 7 Generic BinF algorithm.
Input: Kernel $k(x, y) = \Pi_{i=1}^{D} k_i(|x^i-y^i|)$ with parameter γ, input dimension D, and number of basis functions (bins) M.
1. Compute coordinate-wise probability distributions $p_i(\Delta) = \ddot{k}^i(\Delta)$.
2. Construct map as:
   For p=1 to M do
     Draw grid parameters δ, $u \in \mathbb{R}^D$ with pitch $\delta^i \propto p_i$, and shift $u^i$ from uniform distribution on $[0, \delta^i]$.
     Let z return the coordinate of the bin containing x as a binary indicator vector $$z_p(x) \equiv \text{hash}\left(\left\lceil\frac{x^1-u^1}{\delta^1}\right\rceil, \ldots, \left\lceil\frac{x^D-u^D}{\delta^D}\right\rceil\right).$$

end for
3. Output final feature map as $$z(x) \equiv \frac{1}{\sqrt{M}}[z_1(x) \ldots z_m(x)]. \quad (14)$$

This algorithm is more efficient than RFF since it avoids storing a large random matrix in memory, although its usage has been limited since it cannot represent the RBF kernel. Like the RFF method, the number of basis functions is specified by the implementer and is dependent on the available computational power.

Approximate feature maps may be used to speed up operations on large scale data, e.g. hundreds of thousands to millions of training data points. In at least one embodiment, approximate feature maps are used to exploit nonlinearities in the structure of the data for the purpose of authentication. It has been seen in experiments that approximate feature maps help improve locality significantly.

Feature Selection

Noisy features can impact locality. Some classifiers are robust to noisy features. For instance, the choice of support vectors in the case of an SVM accounts for information contributed by every feature. If a data point is linearly separable in lower dimensional space then it will always be separable in a higher dimensional space created by adding a noisy feature.

Figure 4A:
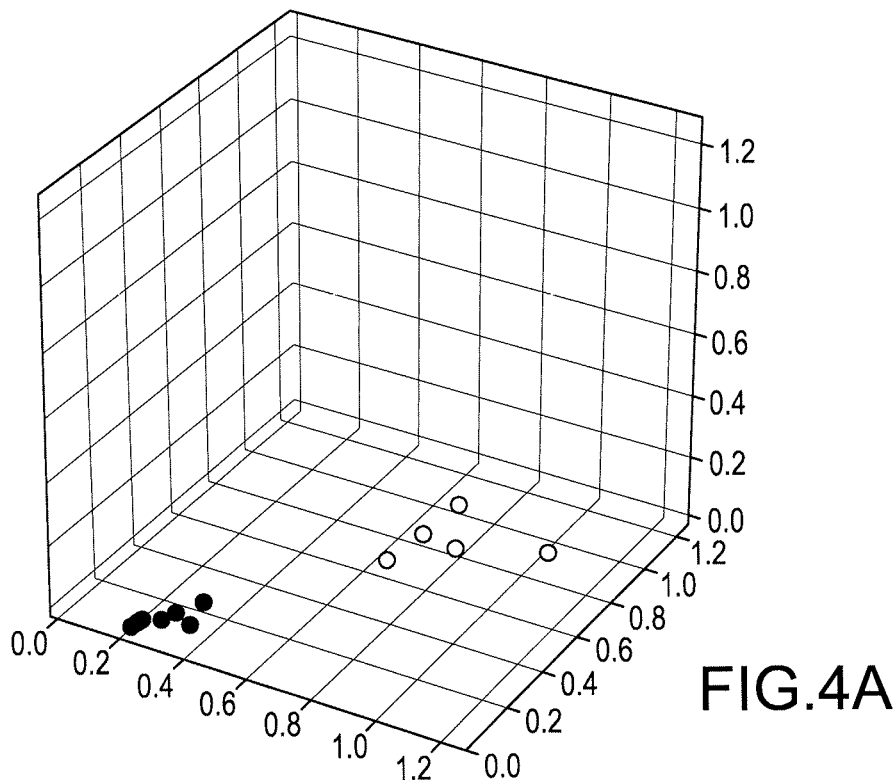
FIG. 4A includes two clusters well separated in two-dimensional space.
Figure 4B:
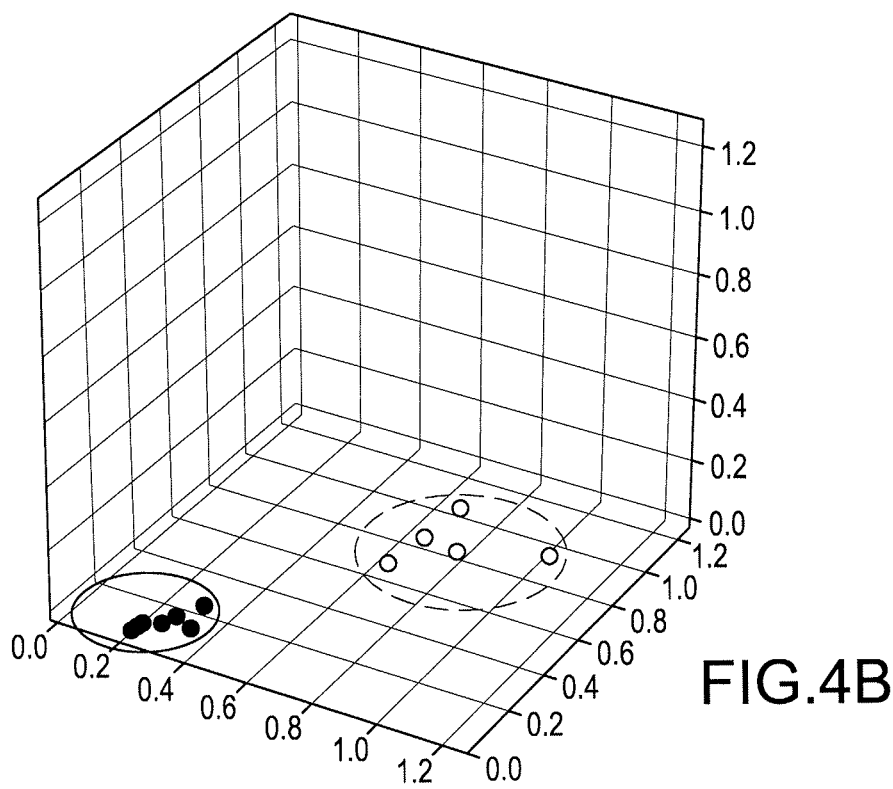
FIG. 4B includes two-dimensional hyperspheres around the two clusters.
Figure 4C:
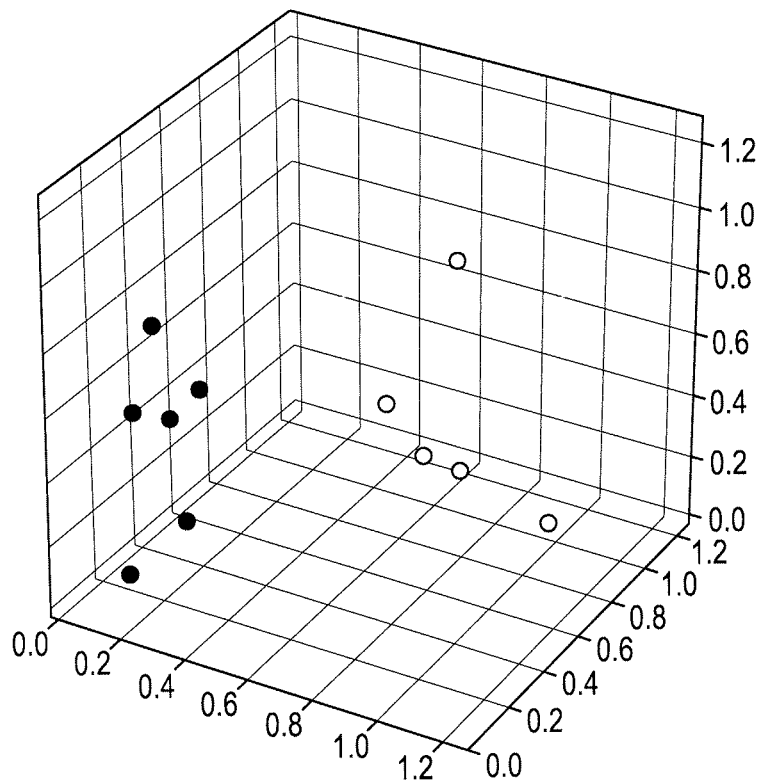
FIG. 4C adds a third feature to the data points of FIG. 4A, wherein the third feature is a noisy feature.
Figure 4D:
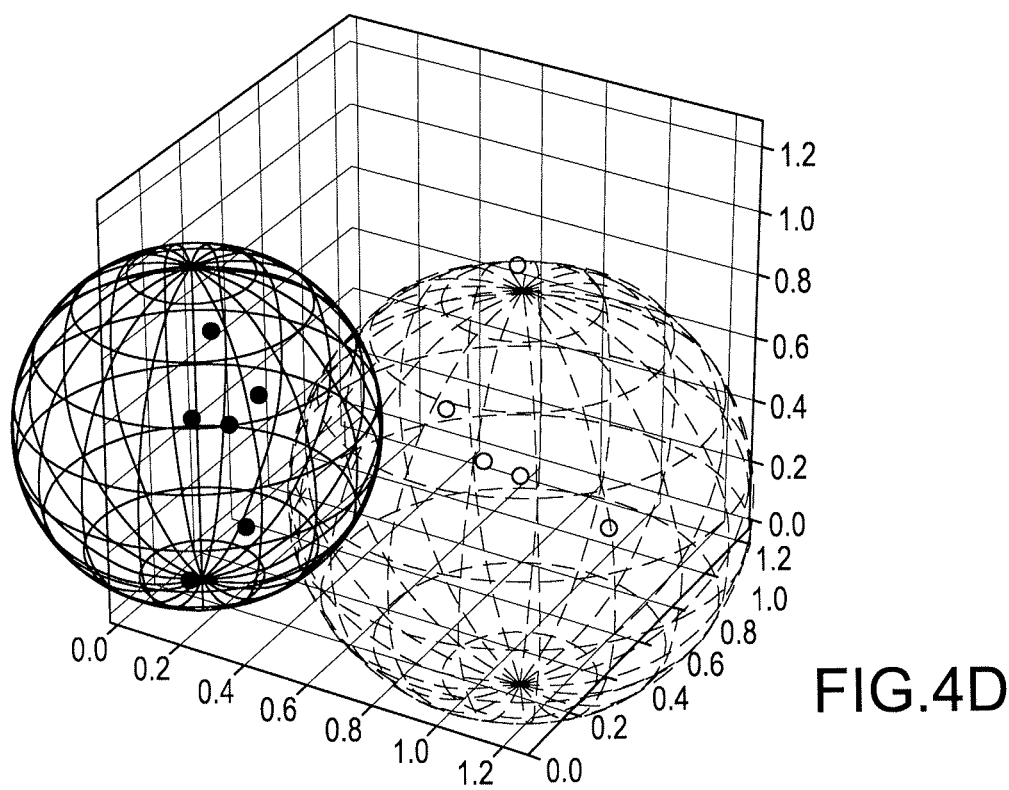
FIG. 4D includes three-dimensional hyperspheres around the two clusters of data points.

Consider, for example, two clusters that are well separated in two-dimensional feature space (FIG. 4A and FIG. 4B). If a third noisy feature is added (FIG. 4C), the two clusters will still be linearly separable, and an SVM will be able to find suitable support vectors. However in terms of relative locality measure, which depends on the distances in the transformed feature space, noisy features can affect locality. For instance, in FIG. 4D, the locality can be visualized by building a hypersphere around the centroid of all points belonging to the same classification (FIG. 4D).

User Authentication

User authentication and impostor detection are advantageous. Analytical tools may operate on a large amount of user-generated data and perform data-driven analysis.

Each time a user makes contact, an event is generated. Thus, at each epoch in an event stream, there is some user activity and hence user-related content. Some examples of such events include a user making a call, a user logging into the user's account, or a user requesting a transfer. These events, and information generated during these events, may be captured or recorded. Examples of data generated by an event include the following:

Phone
  a. Features related to a caller's geographic location, phone device type, or call provenance
  b. Voice biometric features when user places call
  c. Automatic number identification (ANI) information and other derived features
  d. Authentication successes or authentication failed attempts
Web
  a. Data from cookies
  b. Internet Protocol (IP) addresses
  c. Authentication successes or authentication failed attempts
Transaction
  a. Transaction type
  b. Object shipped to new address?
  c. Travel notification to certain countries Such data can be used for user authentication and impostor detection in two main ways. First, in the context of authentication, each event may be scrutinized to classify it as either genuine or not genuine. Second, in the context of impostor detection, the universe of events is explored to identify behavior or patterns. Although the goal of both user authentication and impostor detection is the same (i.e., separate genuine events from not genuine events), each warrants a different approach or a paradigm. In the case of authentication, an event may be matched to a profile of the purported user. In the case of impostor detection, an event may be matched to all profiles of known impostors.

In at least one embodiment, user profiles are created both for genuine users and for impostors. In at least one embodiment, a kernel mapping to a feature space with good locality for a dataset is used for user authentication and/or impostor detection.

Offline Tuning of Feature Selection and Kernel Selection (e.g. for User Authentication)

Offline tuning is a way to understand the underlying structure of data and come up with a set of parameters that can be used as a search space during online tuning or adaptation. The parameters are the kernel map (whether an explicit kernel map or an approximate kernel map) and the feature set. In at least one embodiment, data is needed sufficient to train several thousands of user profiles. Feature selection can be performed using a greedy algorithm which, at each iteration, chooses the next best feature, where "best" is in terms of localizing the data points related to the same user.

Let $F = \{f_1, f_2, \ldots, f_J\}$. $\tilde{F}$ is the set of all features $f_j \in \tilde{F}, 1 \leq j \leq J$, captured or recorded for an event. For example, $f_1$ could be pitch, $f_2$ could be noise, $f_3$ could be a geography anomaly of the user's interaction, etc. Each $f_j$ may be represented numerically.

Let $\kappa = \{\bar{\psi}_1, \bar{\psi}_2, \ldots, \bar{\psi}_K\}$. $\kappa$ is a set of approximate kernel maps $\bar{\psi}_k \in \kappa$, $1 \leq k \leq K$, where $\bar{\psi}_k: \mathbb{R}^D \to \mathcal{H}_k$. We say $\mathcal{H}_k$ is a feature space.

Let $F = \{F_1, F_2, \ldots, F_L\}$. $F$ is a set of proper subsets of $\tilde{F}$, i.e. $F_l \subset \tilde{F}$, $1 \leq l \leq L$. The $F_l$ are not necessarily mutually disjoint. $F$ can be chosen in different ways. For example, a greedy approach may be used wherein initialization parameters are specified.

Let $\Omega = \{\omega_1, \omega_2, \ldots, \omega_U\}$. $\Omega$ is the set of all distinct users $\omega_u \in \Omega$, $1 \leq u \leq U$, in the dataset. In at least one embodiment, at least one of the $\omega_u$ is an impostor, but the $\omega_u$ are referred to collectively herein as "users". Create a random pool $\bar{\Omega}$ of M users $\omega_m \in \bar{\Omega}$ such that $\bar{\Omega} = \{\omega_1, \omega_2, \ldots, \omega_M\}$, $\bar{\Omega} \subset \Omega$, $1 \leq m \leq M < U$, to use in offline training. Note, in at least one embodiment, one or more restrictions may be placed on the class(es) admitted by $\bar{\Omega}$, including restrictions described herein. Further, generally $M < U$ to reduce training computational complexity, but the embodiments are not limited thereto.

$(x_i, y_i) \in \Theta$ for $i \in \{1, 2, \ldots, N\}$ is a set of data points $x_i$ and labels $y_i$. $x_i$ is the data vector generated by an event i and $y_i$ is a label referring to user $\omega_m$, responsible (or, where an impostor is masquerading as user $\omega_m$, purportedly responsible) for generating the data point $x_i$. Note $\Theta$ is restricted to those data points $x_i$ having a label $y_i$ referring to a user $\omega_m \in \bar{\Omega}$. Generally $N > M$, and therefore there will often be multiple data points $x_i$ having a label $y_i$ referring to a user $\omega_m \in \bar{\Omega}$.

Let $\mathcal{C}_m$ represent a cluster of data points $x_i$. $\mathcal{C}_m$ has a centroid $c_m$.

The following algorithm for offline tuning of feature selection and kernel selection is reproduced as FIG. 7A. Algorithm 8 is an illustrative example, and other embodiments are possible. For example, pre-processing could be performed to reduce complexity associated with the innermost For loop.

---

Algorithm 8 Offline tuning of feature selection and kernel selection (e.g. in user authentication).

---

$\hat{\chi} := \infty$
$(\hat{k}, \hat{l}) := (0,0)$
For $k \in \{1, 2, \ldots, K\}$
　For $l \in \{1, 2, \ldots, L\}$
　　For $i \in \{1, 2, \ldots, N\}$
　　　Use $\bar{\psi}_k$ to map features in $F_l$ of $x_i$ to $\mathcal{H}_k$
　　For $m \in \{1, 2, \ldots, M\}$
　　　$\mathcal{C}_m := \emptyset$
　　　For $i \in \{1, 2, \ldots, N\}$
　　　　If $y_i$ corresponds to user $\omega_m$
　　　　　Include $x_i$ in $\mathcal{C}_m$
　　　Determine the centroid $c_m$ of $\mathcal{C}_m$
　　　Determine the average $A_m^{k,l}$ of $\mathcal{D}(x_i, c_m)$ over all $x_i \in \mathcal{C}_m$
　　Determine the average $\chi_{k,l}$ of all $A_m^{k,l}$, $m \in \{1, 2, \ldots, M\}$
　　If $\chi_{k,l} < \hat{\chi}$
　　　$\hat{\chi} := \chi_{k,l}$
　　　$(\hat{k}, \hat{l}) := (k, l)$
Return $(\hat{k}, \hat{l})$

---

Algorithm 8 returns a pair $(\hat{k}, \hat{l})$ which denotes a pair comprising approximate kernel map $\bar{\psi}_{\hat{k}} \in \kappa$ and feature subset $F_{\hat{l}} \in F$ that together produce a maximally, or approximately maximally, localized feature space $\mathcal{H}_{\hat{k}}$ for data points $(x_i, y_i)$ that correspond to the users in $\bar{\Omega}$.

Determining a User-Specific Threshold for Genuineness

Let $(x_r, y_r) \in \rho$ for $r \in \{1, 2, \ldots, R\}$ be a set of data points $x_r$ and labels $y_r$. The labels $y_r$ may correspond to any user $\omega_u \in \Omega$, and therefore generally $R > N$. Further, generally $R > U$, and therefore there will often be multiple data points $x_r$ having a label $y_r$ referring to a user $\omega_u \in \Omega$. Additionally, note that every $(x_i, y_i) \in \Theta$ is also in $\rho$ and therefore has an index r, but generally $i \neq r$.

The following algorithm for determining thresholds for genuineness specific to each user is reproduced as FIG. 7B. Algorithm 9 is one example of a user-specific threshold determination algorithm. Algorithm 9 uses $\overline{\psi}_{\hat{k}}$ to map the features in $F_{\hat{l}}$ of data points $x_r$, $r \in \{1, 2, \ldots, R\}$, to $\mathcal{H}_{\hat{k}}$, where the algorithm defines clusters $\mathcal{C}_u$, $u \in \{1, 2, \ldots, U\}$, comprising the data points $x_r$ having label $y_r$ corresponding to a user $\omega_u$. Again, pre-processing could be performed to reduce complexity resulting from the inner-most For loop.
Algorithm 9 User-Specific Threshold Determination Algorithm.

For $r \in \{1, 2, \ldots, R\}$
  Use $\overline{\psi}_{\hat{k}}$ to map features in $F_{\hat{l}}$ of $x_r$ to $\mathcal{H}_{\hat{k}}$
For $u \in \{1, 2, \ldots, U\}$
  $\mathcal{C}_u := \emptyset$
  For $r \in \{1, 2, \ldots, R\}$
    If $y_r$ corresponds to user $\omega_u$
      Include $x_r$ in $\mathcal{C}_u$
  Determine the centroid $c_u$ of $\mathcal{C}_u$
  $x_t := \arg\max_{x_r \in \mathcal{C}_u} \mathcal{D}(x_r, c_u)$
  $T_u := \mathcal{D}(x_t, c_u)$
  Return $T_u$ Algorithm 9 returns a threshold $T_u$ for each cluster $\mathcal{C}_u$. In this statement of the algorithm, the threshold $T_u$ defines a maximum value of a relative locality measure. If a new data point and label pair $(x_a, y_a)$ is obtained, wherein $y_a$ purportedly corresponds to a user $\omega_u$, $u \in \{1, 2, \ldots U\}$, the relative locality measure of $x_a$ with respect to the centroid $c_u$ of the cluster $\mathcal{C}_u$ corresponding to user $\omega_u$ may be calculated. Then, if $\mathcal{D}(x_a, c_u) > T_u$, a may be deemed a non-genuine event (e.g., an action taken by an impostor (e.g. invalid login attempt) or fraud or attempted fraud), and the value in $y_a$ may be appended with a flag such as "not_genuine" such that $y_a := \omega_u$.username+"_not_genuine". However, if $\mathcal{D}(x_a, c_u) \leq T_u$, a may be deemed to represent a genuine event, and authentication may be granted. The foregoing description may pertain to embodiments associated with an "authentication" paradigm where the cluster $\mathcal{C}_u$ corresponds to user $\omega_u$.

In the foregoing description, the threshold $T_u$ for each cluster $\mathcal{C}_u$ was the relative locality measure of the data point $x_t \in \mathcal{C}_u$ having the highest relative locality measure of all data points in $\mathcal{C}_u$. However, the embodiments are not limited thereto. That is, factors like design constraints (e.g., time complexity), implementation preferences, and noise in the data may motivate a definition of the threshold for inclusion in a cluster that is different than what is set forth in Algorithm 9.

Offline Tuning of Feature Selection and Kernel Selection (e.g. for Use in Fraud Detection)

In at least one embodiment, a "non-genuineness" paradigm concerned with non-genuine events may be implemented, e.g. without regard to the user. Feature selection and kernel selection may be tuned for the non-genuineness paradigm. An example algorithm for the non-genuineness paradigm is given below and reproduced as FIG. 8A.

---

Algorithm 10 Offline tuning of feature selection and kernel selection (e.g. for fraud detection).

$\hat{\chi} := \infty$
$(\hat{k}, \hat{l}) := (0, 0)$
For $k \in \{1, 2, \ldots, K\}$
  For $l \in \{1, 2, \ldots, L\}$
    $\mathcal{C}_{NG} := \emptyset$
    For $i \in \{1, 2, \ldots, N\}$

---

Algorithm 10 Offline tuning of feature selection and kernel selection (e.g. for fraud detection).

Use $\overline{\psi}_k$ to map features in $F_l$ i of $x_i$ to $\mathcal{H}_k$
    If $y_i$ includes a "not_genuine" flag
      Include $x_i$ in $\mathcal{C}_{NG}$
    Determine the centroid $c_{NG}$ of $\mathcal{C}_{NG}$
    Determine the average $\psi_{k,l}$ of $\mathcal{D}(x_i, c_{NG})$ over all $x_i \in \mathcal{C}_{NG}$
    If $\psi_{k,l} < \hat{\chi}$
      $\hat{\chi} := \chi_{k,l}$
      $(\hat{k}, \hat{l}) := (k, l)$
Return $(\hat{k}, \hat{l})$

---

Note Algorithm 10 is restricted to $(x_i, y_i) \in \Theta$ to reduce computational complexity, but the embodiments are not limited thereto. Algorithm 10 may be generalized beyond non-genuineness to any desired attribute to find a favorable feature subset and approximate kernel map for a certain cluster of labels denoting that attribute, e.g. by amending "If $y_i$ includes a "not_genuine" flag" and "NG" as appropriate.

Determining a Threshold for Non-Genuineness (e.g. Fraud)

The following algorithm for determining a threshold for non-genuineness is reproduced as FIG. 8B. Algorithm 11 is one example of a non-genuineness threshold determination algorithm. Algorithm 11 uses $\overline{\psi}_{\hat{k}}$ to map the features in $F_{\hat{l}}$ of data points $x_i$, $i \in \{1, 2, \ldots, N\}$, to $\mathcal{H}_{\hat{k}}$, where the algorithm defines a cluster $\mathcal{C}_{NG}$, comprising the data points $x_i$ having label $y_i$ indicating the event giving rise to data point $x_i$ was not genuine (e.g. activity of an impostor).

Algorithm 11 Non-Genuineness Threshold Determination Algorithm.

For $i \in \{1, 2, \ldots, N\}$
  Use $\overline{\psi}_{\hat{k}}$ to map features in $F_{\hat{l}}$ of $x_i$ to $\mathcal{H}_{\hat{k}}$
  If $y_i$ includes a "not_genuine" flag
    Include $x_i$ in $\mathcal{C}_{NG}$
Determine the centroid $c_{NG}$ of $\mathcal{C}_{NG}$
$x_t := \max_{x_i \in \mathcal{C}_{NG}} \mathcal{D}(x_i, c_{NG})$
$T := \mathcal{D}(x_t, c_{NG})$
Return $T$ In the foregoing description, the threshold $T$ for cluster $\mathcal{C}_{NG}$ is the relative locality measure of the data point $x_t \in \mathcal{C}_{NG}$ having the highest relative locality measure of all data points in $\mathbb{R}_{NG}$. However, the embodiments are not limited thereto. That is, factors like design constraints (e.g., time complexity), implementation preferences, and noise in the data may motivate a definition of the threshold for inclusion in a cluster that is different than what is set forth in Algorithm 11.

The non-genuineness threshold determination algorithm as represented above is limited to users in $\overline{\Omega}$ to reduce running time. Iterating over all users in $\Omega$ may be desirable to increase accuracy in at least one embodiment.

Both users and impostors (e.g. fraudsters) may be profiled or classified or authenticated using diverse data. Specifically, and without limitation, this diverse data may include phoneprint features, voiceprint features, ANI features, and transaction request type features. Phoneprint features pertain to the user's phone(s) both in a present call and in prior calls, including spectral features, noise, packet loss, packet delay, signal latency, International Mobile Equipment Identity (IMEI), International Mobile Subscriber Identity (IMSI), caller ID/phone number, information obtained from DTMF tones, or encodings of DTMF tones, and call provenance. Voiceprint features may include various features obtained by processing a user's speech signals. Transaction request type features may include features derived from a myriad of transaction request types, depending on the context and purpose of the event (e.g. call) and/or the offerings of an interactive voice response (IVR) system with which the user interacts.

A voiceprint may comprise features or voiceprint features. Voiceprint features may be in the form of, or based on, an i-vector. Voiceprint features may be determined using a technique including front-end factor analysis. Voiceprint features may include at least one of Mel-Frequency Cepstral Coefficients, Perceptual Linear Prediction, or Relative Spectral Transform—Perceptual Linear Prediction.

In at least one embodiment, each data point may include one or more features related to a phoneprint of a phone. Similarly, in at least one embodiment, each data point may include one or more features related a voiceprint. Using the methods broadly described herein, the data points may be clustered. Further, a new data point may be classified based on its relative locality measure.

In at least one embodiment, each data point may represent an event related to online activity. For example, features may be extracted from session logs from interaction with a web site or server, features may be related to authentication success or failure, and features may pertain to a conversation transcript (including speech to text transcription).

In at least one embodiment, a centroid of a cluster of data points in the feature space may be calculated, and an unlabeled data point may be compared to the centroid. The unlabeled data point may be compared to one or more labeled data points or one or more other unlabeled data points. Labeled data points may be compared with other labeled data points. Coordinates of any of the data points and/or the centroid may be stored in a memory device. Coordinates of the centroid may be compared with the coordinates of one or more unlabeled data points. The coordinates of the centroid may be compared with the coordinates of one or more of labeled data points. The dataset may include multiple clusters, and each cluster may have a centroid. The coordinates of one centroid may be compared to the coordinates of another centroid.

In at least one embodiment, users that are not genuine may be fraudsters, and activity that is not genuine may be fraud. In at least one embodiment, impostors may be fraudsters or not genuine.

A relative locality measure may be used to label or classify a new instance or data point. The new data point may be labeled or classified as genuine or not genuine based on its relative locality measure with respect to, without limitation, another data point or a centroid of a cluster. In this regard, the classifying the data point as genuine or not genuine may be viewed as authenticating the data point and/or a user corresponding to the data point. Further, the classifying the data point as genuine or not genuine may be viewed as determining the event is not genuine (e.g. fraudulent or spoofed).

Figure 5:
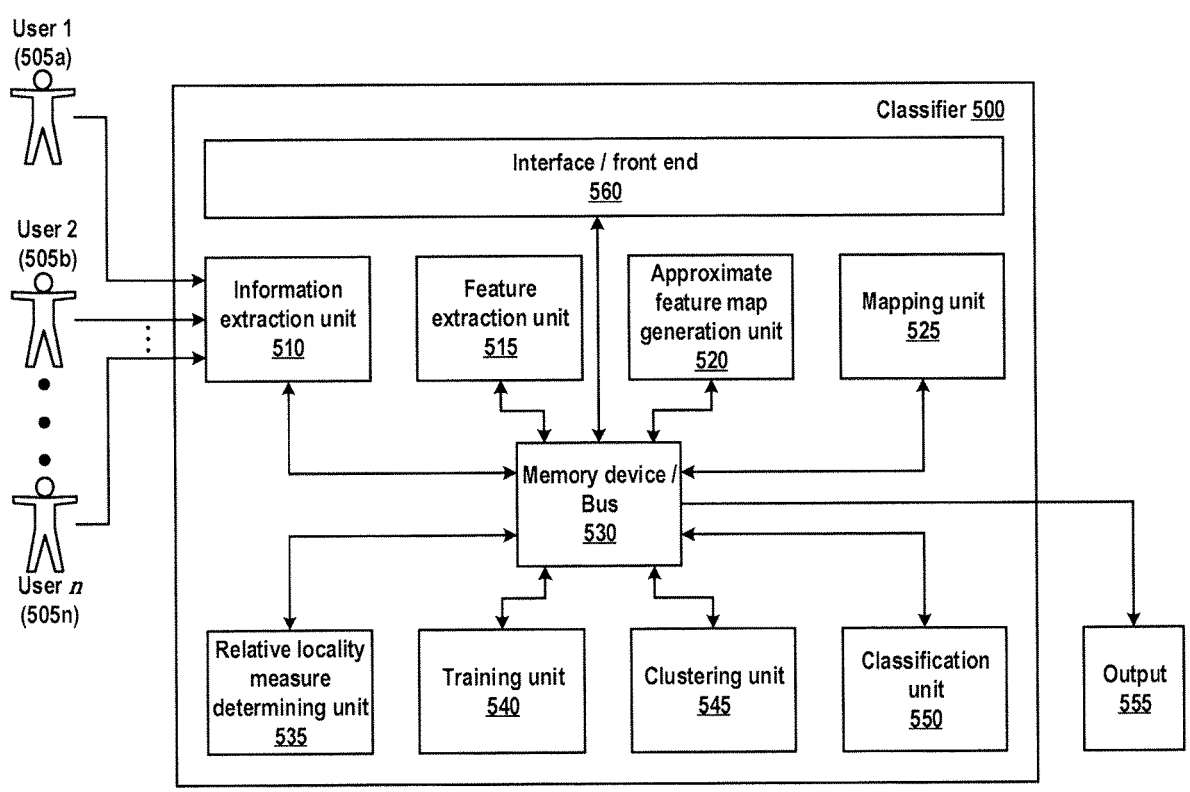
FIG. 5 is a block diagram illustrating an example system for rapid classification of users according to at least one embodiment.

FIG. 5 is a block diagram illustrating an example system for rapid classification of users according to at least one embodiment. FIG. 5 includes classifier 500 and output 555. FIG. 5 also includes user 1 (505a), user 2 (505b), . . . , user n (505n), which are referred to collectively as "users 505". Classifier 500 includes information extraction unit 510, feature extraction unit 515, approximate feature map generation unit 520, mapping unit 525, memory device/bus 530, relative locality measure determining unit 535, training unit 540, clustering unit 545, and classification unit 550.

The information extraction unit 510 may obtain information from users 505. The information obtained by the information extracting unit 510 may be unstructured, and the information extraction unit may convert the unstructured data to structured data. The information extraction unit may include a connection to a phone network or other network and may obtain the information via the connection to the phone network or other network or via any sensor for receiving input, including, but not limited to, a microphone or camera. The information extraction unit 510 receives information pertaining to events generated by users 505. Note users 505 may be, without limitation, genuine users or not genuine users. The information extraction unit may generate data points pertaining to the events generated by the users 505. The data points generated by the information extraction unit 510 may include features pertaining to the events generated by the users 505. The data points may be saved in or provided to the memory device/bus 530.

The feature extraction unit 515 extracts features from the data points pertaining to the events generated by the users 505. The feature extraction unit may select a subset of features according to the methods disclosed herein. The features may be saved in or provided to the memory device/bus 530.

The approximate feature map generation unit 520 may generate or determine an approximate feature map. An approximate feature map may be generated by, without limitation, spectral methods or an approximation scheme, including an approximation scheme involving randomization or pseudorandomization. An approximate feature map may be generated by, without limitation, a Nyström method, random Fourier features approximation, or a random binning transform. The approximate feature map generation unit 520 may also be able to provide an explicit kernel map or an implicit kernel map. The approximate feature map generation unit 520 may receive via, for example, the interface/front end 560, at least one predetermined approximate feature map agnostic to the data on which it will operate. An approximate feature map, an approximate kernel map, an explicit kernel map, or an implicit kernel map may be saved in or provided to the memory device/bus 530.

The mapping unit 525 may map features from an input space to a feature space or from a first feature space to a second feature space using an approximate feature map determined by the approximate feature map generation unit 520 or an explicit kernel map provided by the approximate feature map generation unit 520. The mapping unit 525 may map features using an implicit kernel map. The features may be the features extracted by the feature extraction unit 515.

The memory device/bus 530 may comprise a system bus, memory bus, volatile storage, or non-volatile storage. Further, the memory device/bus 530 may comprise a bus connecting multiple computers. The memory device/bus may connect computers via a network or Internet connection. That is, the various components in the classifier 500 may be part of a distributed computing system, and the memory device/bus 530 may connect the various components in the distributed computing system. Thus, the memory device/bus 530 may include a network connection and equipment such as routers, gateways, network adapters, etc., to enable the various components of the classifier 500 to communicate and perform methods, including the methods described herein.

The relative locality measure determining unit 535 may determine a relative locality measure according to the methods disclosed herein. The relative locality measure determined by the relative locality measure determining unit 535 may be saved in or provided to the memory device/bus 530.

The training unit 540 trains or learns or selects a classifier. The classifier may be a kernel and a set of features. The classifier may comprise an explicit kernel map or an approximate feature map. The classifier may comprise a set of features. The kernel trained or learned or selected by the training unit 540 may be determined or provided by the approximate feature map generation unit 520. Generally, the set of features trained or learned or selected by the training unit 540 might not be values for features (e.g. device_type=5, username="Doe") but rather feature "types" (e.g. device_type, username). The set of features trained or learned or selected by the training unit 540 may be a subset or proper subset of the features extracted by the information extraction unit 510 or feature extraction unit 515. The set of data points provided to the training unit 540 may be a subset or proper subset of all data points extracted by the information extraction unit 510. The training unit 540 may train or learn or select a classifier according to the methods disclosed herein. The explicit kernel map or approximate feature map or set of features trained or learned or selected by the training unit 540 may be saved in or provided to the memory device/bus 530.

The clustering unit 545 may determine at least one cluster. The clustering unit 545 may also determine a centroid of a cluster. The clustering unit 545 may determine which data points to include in a cluster. The clustering unit 545 may determine which data points to include in a cluster based on a label associated with each data point. The clustering unit 545 may determine a threshold for inclusion in a cluster. The clustering unit 545 may determine a threshold for inclusion in a cluster based on a relative locality measure determined by the relative locality measure determining unit 535, including a relative locality measure of a data point with respect to a centroid of the cluster. The clustering unit 545 may determine an average of relative locality measures of data points in a cluster with respect to the cluster centroid. The cluster, centroid of a cluster, which data point(s) to include in a cluster, threshold for inclusion, or average of relative locality measures of data points determined by the clustering unit 545 may be provided to or saved in the memory device/bus 530.

The classification unit 550 may classify data points included in a cluster by the clustering unit 545. The classification unit 550 may classify a data point by assigning a label or flag to the data point. The classification unit 550 may classify a data point based on one or more labels or flags associated with the data point. The data point may include one or more labels or flags. Further, the classification unit 550 may classify a data point for a new event generated by a user 505. That is, after training, the information extraction unit 510 may extract information from a user 505 pertaining to a new event, and a new data point may be prepared including features extracted by the feature extraction unit 515. The kernel provided by the approximate feature map generation unit 520 may be used by the mapping unit 525 to map the features from the new data point. The clustering unit 545 may use a relative locality measure determined by the relative locality measure determining unit 535 based on the mapped features of the new data point to determine to which cluster the new data point should belong. The classification unit 550 may assign a label to the new data point based on the cluster to which the new data point was assigned. The classification unit 550 may provide an output 555 based on the label assigned to the new data point. The classification or label or flag determined by the classification unit 550 may be provided in or saved to the memory device/bus 530.

The output 555 may be a label or flag assigned by the classification unit 550. The output 555 may be that an event should be deemed genuine or that the event should be deemed not genuine. The output 555 may be to permit authentication. The output 555 may be to deny authentication. The output 555 may be a kernel, explicit kernel map, or approximate feature map determined by the approximate feature map generation unit 520. The output may be a kernel, explicit kernel map, or approximate feature map learned or selected by the training unit 540. The output 555 may be a set or subset of features learned or selected by the training unit 540. The output 555 may be information obtained or determined during the course of performing the methods disclosed herein, and the interface/front end 560 may be used to select a type of information to output as output 555.

The output 555 may be in the form of a signal or data provided to an interactive voice response system (IVR). The event from a user 505 may be a voice input or dual tone multi frequency (DTMF) input to an IVR, and the output 555 may be provided to the IVR in real time or near real time such that the user is deemed genuine or not genuine (or authenticated or not authenticated or determined to be an impostor) during the call in which the event occurred. The output 555 may be provided to a display in a call center, and an operator in a call center may be able to view the output 555 on the display in real time or near real time during the call in which an event occurs that is the basis for a data point. The output 555 may be provided in real time, or near real time, to authorities such as law enforcement or medical or fire response.

The interface/front end 560 may provide an interface to control the classifier 500. The interface/front end may include an output device such as a display or speaker and/or one or more input devices such as a keyboard, mouse, or microphone. A display may be, without limitation, a monitor, a LCD or LED panel, a projector, or a television. A display may be integrated into a portable computer, smartphone, tablet, or personal digital assistant. The interface/front end 560 may be used to provide information obtained or determined by the classifier 500, including output 555. The interface/front end 560 may also receive arguments to parameters for the methods disclosed herein. The interface/front end 560 may be geographically remote from the rest of the classifier 500 and connected to the rest of the classifier 500 via a network connection included in the memory device/bus 530.

As used herein, an approximate kernel map is an example of an approximate feature map. An approximate feature map may be generated by, without limitation, a Nyström method, a random Fourier features method, or a random binning transform.

Figure 6:
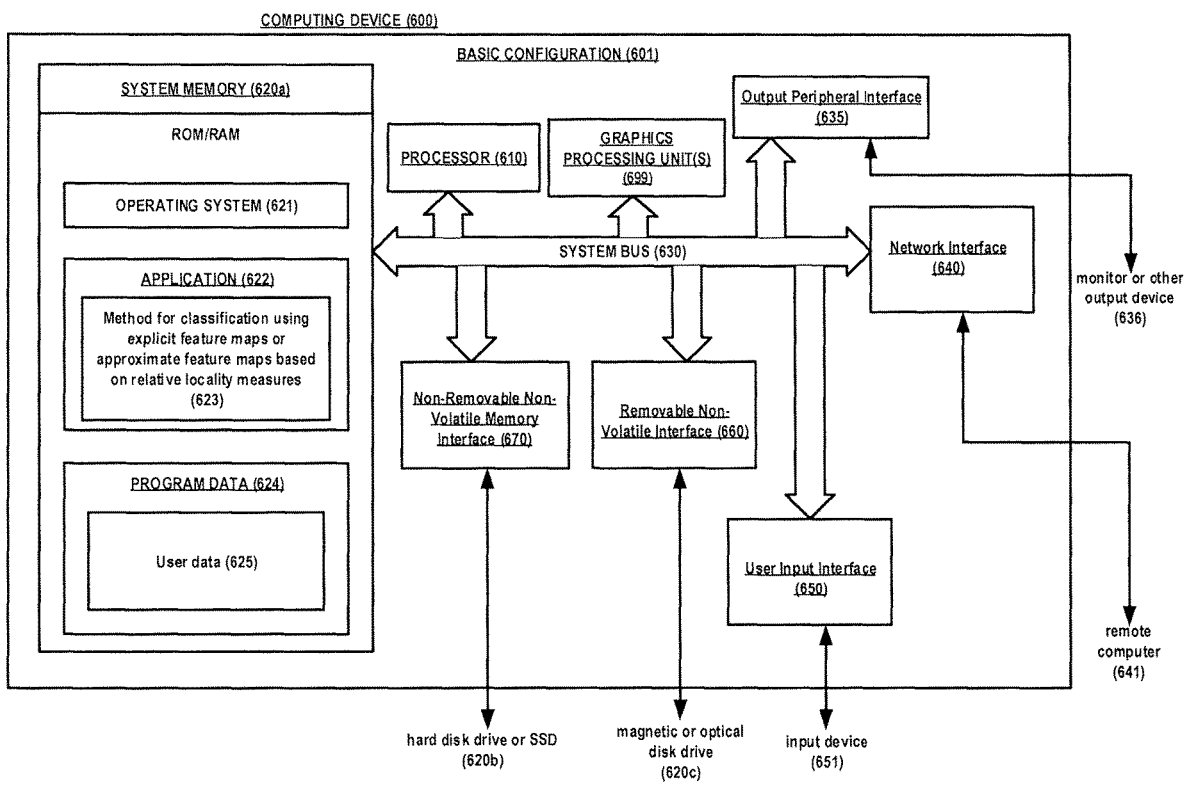
FIG. 6 is a high-level block diagram of an exemplary computing device that is arranged for classification using a feature map based on a relative locality measure according to at least one embodiment.

FIG. 6 is a high-level block diagram of an exemplary computing device (600) that is arranged for classification using an explicit feature map or an approximate feature map based on a relative locality measure according to at least one embodiment. In a very basic configuration (601), the computing device (600) typically includes one or more processors (610) and system memory (620a). A system bus (630) can be used for communicating between the processor (610) and the system memory (620a).

Depending on the desired configuration, the processor (610) can be of any type including but not limited to a microprocessor (µP), a microcontroller (µC), a digital signal processor (DSP), or the like, or any combination thereof. The processor (610) can include one more levels of caching, a processor core, and registers. The processor core can include an arithmetic logic unit (ALU), a floating point unit (FPU), a digital signal processing core (DSP Core), or the like, or any combination thereof. A memory controller can also be used with the processor (610), or in some implementations the memory controller can be an internal part of the processor (610).

Depending on the desired configuration, the system memory (620*a*) can be of any type including but not limited to volatile memory (such as RAM), non-volatile memory (such as ROM, flash memory, etc.) or any combination thereof. System memory (620*a*) typically includes an operating system (621), one or more applications (622), and program data (624). The application (622) may include a method for classification using an explicit feature map or an approximate feature map based on a relative locality measure (623). Program Data (624) includes storing instructions that, when executed by the one or more processing devices, implement a system and method for classification using an explicit feature map or an approximate feature map based on a relative locality measure. In some embodiments, the application (622) can be arranged to operate with program data (624) on an operating system (621).

The computing device (600) can have additional features or functionality, and additional interfaces to facilitate communications between the basic configuration (601) and any required devices and interfaces, such non-removable non-volatile memory interface (670), removable non-volatile interface (660), user input interface (650), network interface (640), and output peripheral interface (635). A hard disk drive or SSD (620*b*) may be connected to the system bus (630) through a non-removable non-volatile memory interface (670). A magnetic or optical disk drive (620*c*) may be connected to the system bus (630) by the removable non-volatile interface (660). A user of the computing device (600) may interact with the computing device (600) through input devices (651) such as a keyboard, mouse, or other input peripheral connected through a user input interface (650). A monitor or other output peripheral device (636) may be connected to the computing device (600) through an output peripheral interface (635) to provide output from the computing device (600) to a user or another device System memory (620*a*) is an example of computer storage media. Computer storage media includes, but is not limited to, RAM, ROM, EEPROM, flash memory or other memory technology, CD-ROM, digital versatile disks (DVD), Blu-ray Disc (BD) or other optical storage, magnetic cassettes, magnetic tape, magnetic disk storage or other magnetic storage devices, or any other medium which can be used to store the desired information and which can be accessed by computing device (600). Any such computer storage media can be part of the computing device (600). One or more graphics processing units (GPUs) (699) may be connected to the system bus (630) to provide computing capability in coordination with the processor (610), including when single instruction, multiple data (SIMD) problems are present.

The computing device (600) may be implemented in an integrated circuit, such as a microcontroller or a system on a chip (SoC), or it may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that includes any of the above functions. In addition, the computing device (600) may be implemented as a personal computer including both laptop computer and non-laptop computer configurations, one or more servers, Internet of Things systems, and the like. Additionally, the computing device (600) may operate in a networked environment where it is connected to one or more remote computers over a network using the network interface (650).

The computing device (600) may implement the classifier (500), the information extraction unit (510), the feature extraction unit (515), the approximate feature map generation unit (520), the mapping unit (525), the memory device/bus (530), the relative locality measure determining unit (535), the training unit (540), the clustering unit (545), the classification unit (550), and/or the interface/front end (560). The computing device (600) may determine the output (555). The computing device (600) may perform any of the algorithms disclosed herein, including, without limitation, any of Algorithms 1-11. The computing device (600) may implement any of the methods or systems disclosed herein, including without limitation, method 900, method 1000, method 1100, method 1600, method 1700, method 1800, and/or method 1900.

Some of the matter disclosed herein may be implemented in software and that some of the matter disclosed herein may be implemented in hardware. Further, some of the matter disclosed herein that may be implemented in software may be implemented in hardware and that some of the matter disclosed herein that may be implemented in hardware may be implemented in software. As used herein, "implemented in hardware" includes integrated circuitry including an application-specific integrated circuit (ASIC), a field programmable gate array (FPGA), a digital signal processor (DSP), an audio coprocessor, and the like.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. The mechanisms, or portions thereof, of the subject matter described herein are capable of being distributed as a program product in a variety of forms, and that an illustrative embodiment of the subject matter described herein applies regardless of the type of non-transitory computer-readable medium used to carry out the distribution. Examples of a non-transitory computer-readable medium include, but are not limited to, the following: a recordable type medium such as a floppy disk, a hard disk drive, a solid state drive (SSD), a Compact Disc (CD), a Digital Video Disk (DVD), a Blu-ray disc (BD), a digital tape, a computer memory, an electrically erasable programmable read-only memory (EEPROM), etc.

Figure 9:
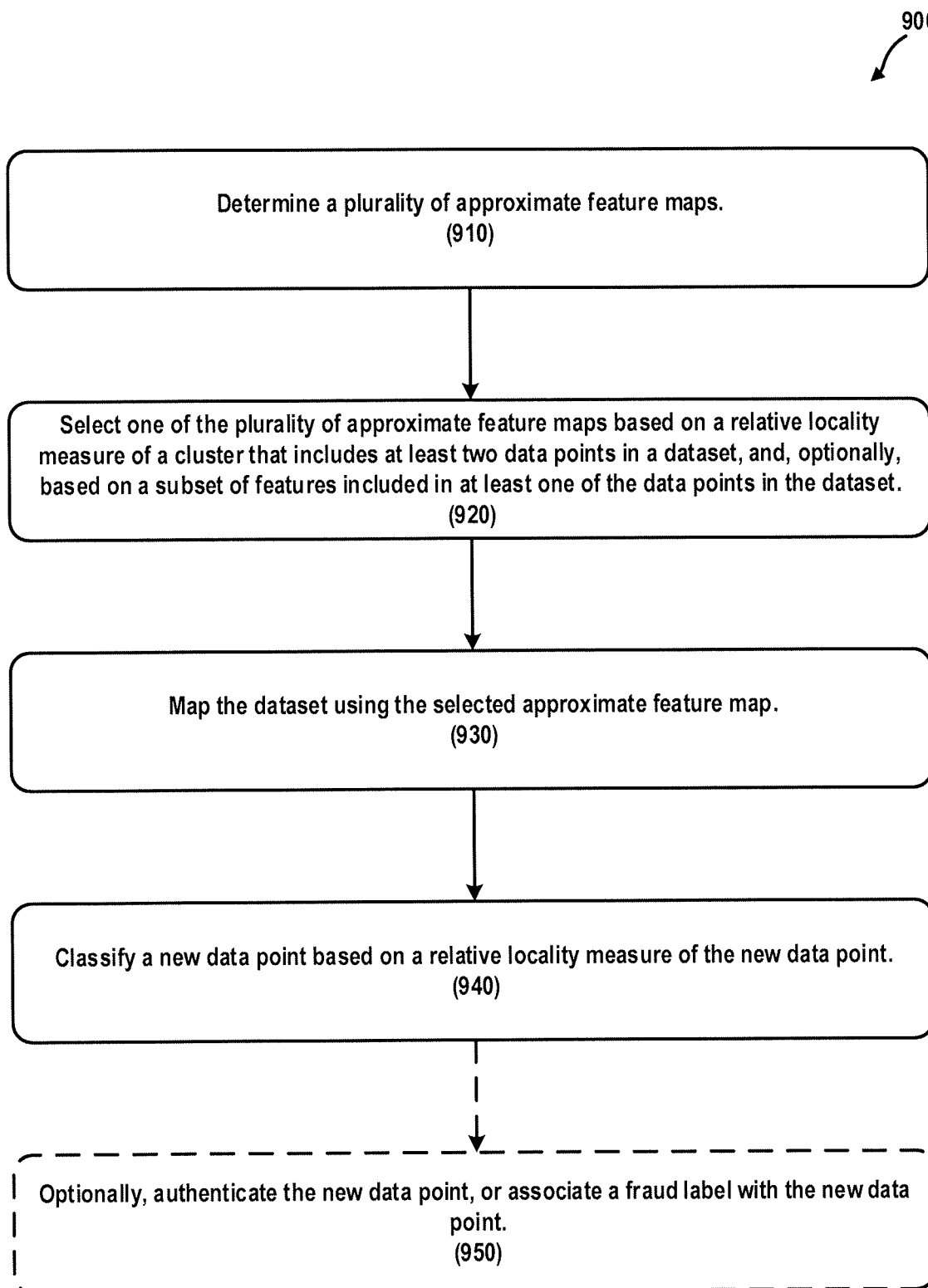
FIG. 9 is a flowchart illustrating a computer-implemented method operating on a dataset that includes data points of events of one or more users according to at least one embodiment.

FIG. 9 is a flowchart illustrating a computer-implemented method (900) operating on a dataset that includes data points of events of one or more users according to at least one embodiment. First, a plurality of approximate feature maps are determined (910). Second, one of the plurality of approximate feature maps is selected (920) based on a relative locality measure of a cluster that includes at least two data points in a dataset, and, optionally, based on a subset of features included in at least one of the data points in the dataset. Third, the dataset is mapped (930) using the selected approximate feature map. Fourth, a new data point is classified (940) based on a relative locality measure of the new data point. Optionally, fifth, the new data point is authenticated (950), or a fraud label is associated (950) with the new data point.

Figure 10:
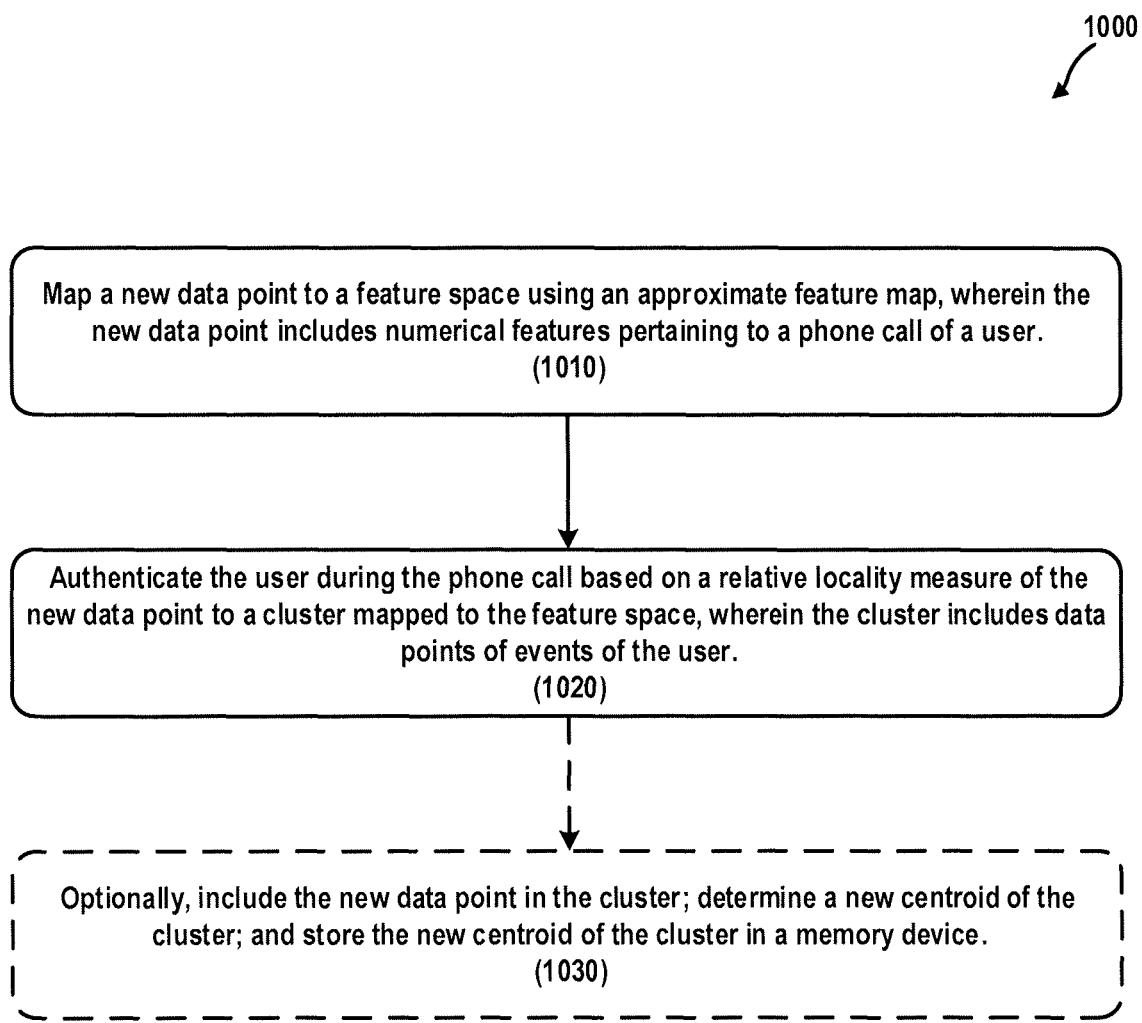
FIG. 10 is a flowchart illustrating a computer-implemented method of authenticating a user according to at least one embodiment.

FIG. 10 is a flowchart illustrating a computer-implemented method (1000) of authenticating a user according to at least one embodiment. First, a new data point is mapped (1010) to a feature space using an approximate feature map, wherein the new data point includes numerical features pertaining to a phone call of a user. Second, the user is authenticated (1020) during the phone call based on a relative locality measure of the new data point to a cluster mapped to the feature space, wherein the cluster includes data points of events of the user. Optionally, third, the new data point is included (1030) in the cluster; a new centroid of the cluster is determined (1030); and the new centroid of the cluster is stored (1030) in a memory device.

Figure 11:
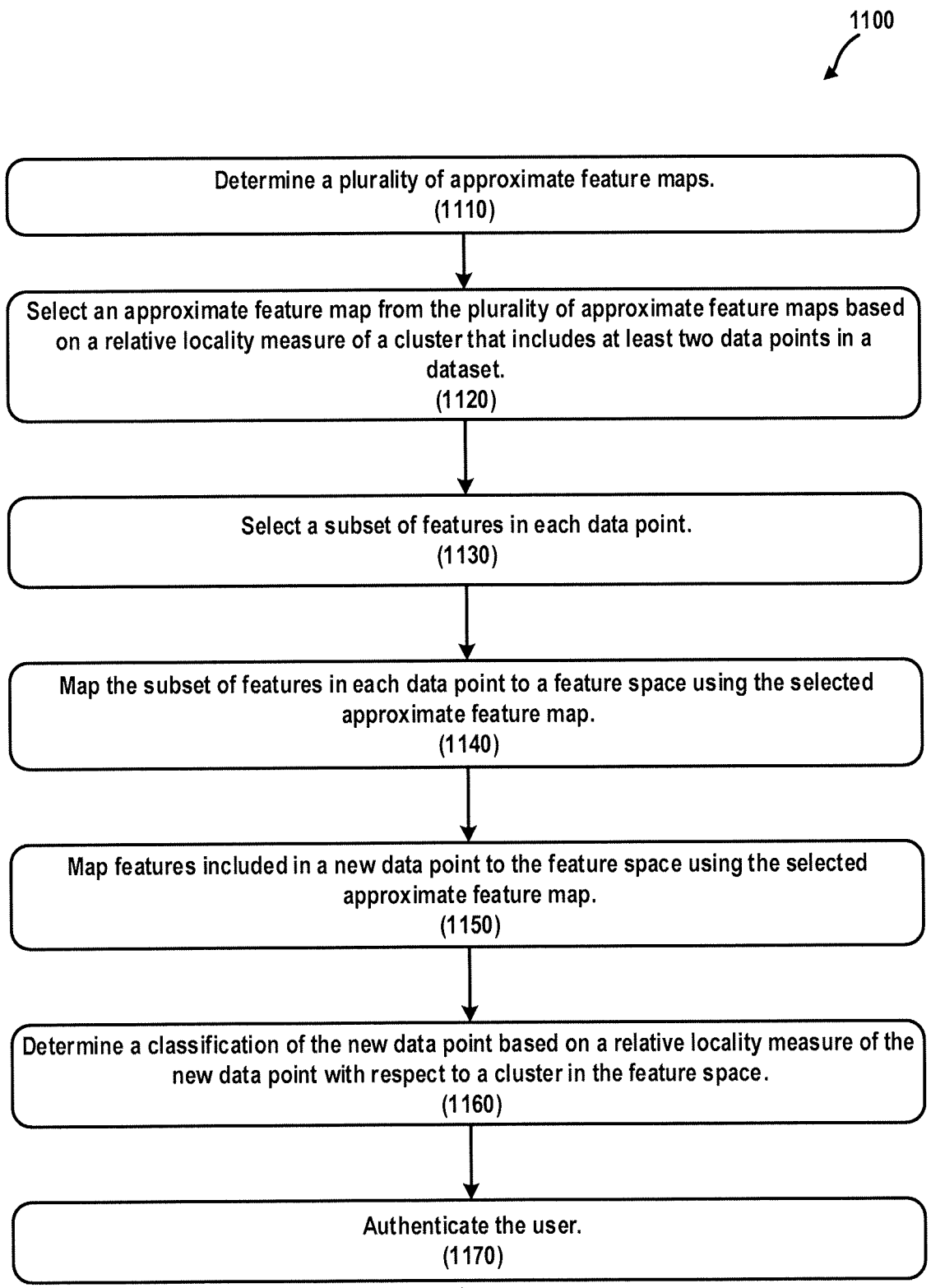
FIG. 11 is a flowchart illustrating a computer-implemented method of authenticating a user according to at least one embodiment.

FIG. 11 is a flowchart illustrating a computer-implemented method (1100) of authenticating a user according to at least one embodiment. First, a plurality of approximate feature maps are determined (1110). Second, an approximate feature map from the plurality of approximate feature maps is selected (1120) based on a relative locality measure of a cluster that includes at least two data points in a dataset. Third, a subset of features in each data point is selected (1130). Fourth, the subset of features in each data point is mapped (1140) to a feature space using the selected approximate feature map. Fifth, features included in a new data point are mapped (1150) to the feature space using the selected approximate feature map. Sixth, a classification of the new data point is determined (1160) based on a relative locality measure of the new data point with respect to a cluster in the feature space. Seventh, the user is authenticated (1170).

Figure 16:
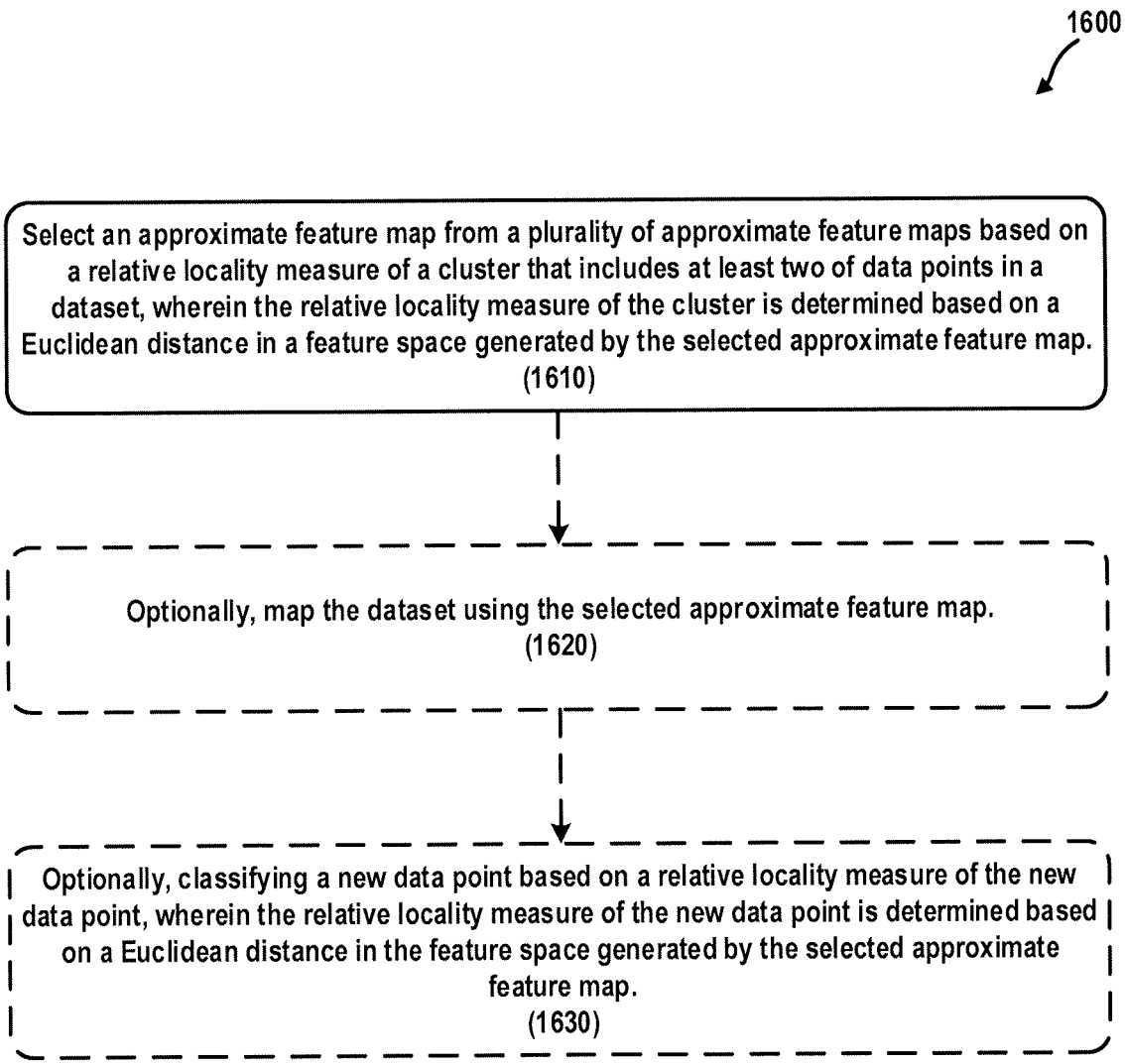
FIG. 16 is a flowchart illustrating a computer-implemented method operating on a dataset that includes data points of events of one or more users according to at least one embodiment.

FIG. 16 is a flowchart illustrating a computer-implemented method (1600) operating on a dataset that includes data points of events of one or more users according to at least one embodiment. First, an approximate feature map is selected (1610) from a plurality of approximate feature maps based on a relative locality measure of a cluster that includes at least two of data points in a dataset, wherein the relative locality measure of the cluster is determined based on a Euclidean distance in a feature space generated by the selected approximate feature map. Optionally, second, the dataset is mapped (1620) using the selected approximate feature map. Optionally, third, a new data point is classified (1630) based on a relative locality measure of the new data point, wherein the relative locality measure of the new data point is determined based on a Euclidean distance in the feature space generated by the selected approximate feature map.

Figure 17:
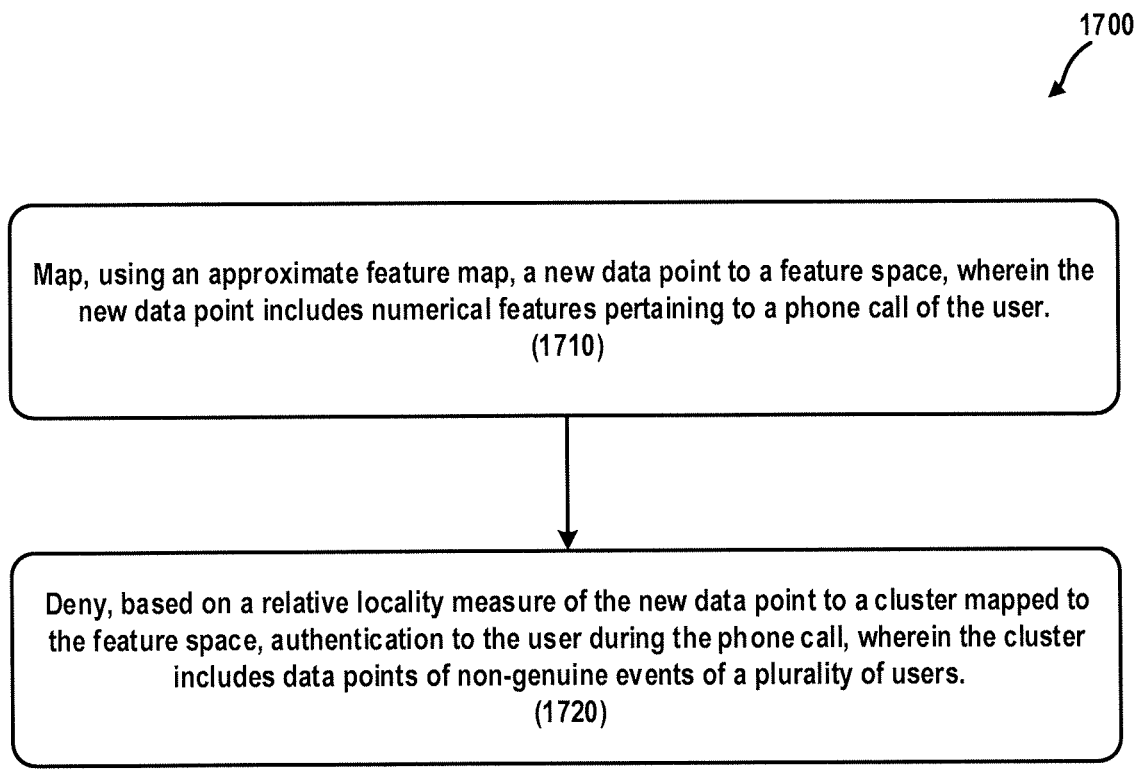
FIG. 17 is a flowchart illustrating a computer-implemented method of denying authentication to a user according to at least one embodiment.

FIG. 17 is a flowchart illustrating a computer-implemented method (1700) of denying authentication to a user according to at least one embodiment. First, using an approximate feature map, a new data point is mapped (1710) to a feature space, wherein the new data point includes numerical features pertaining to a phone call of the user. Second, based on a relative locality measure of the new data point to a cluster mapped to the feature space, authentication to the user is denied (1720) during the phone call, wherein the cluster includes data points of non-genuine events of a plurality of users.

Figure 18:
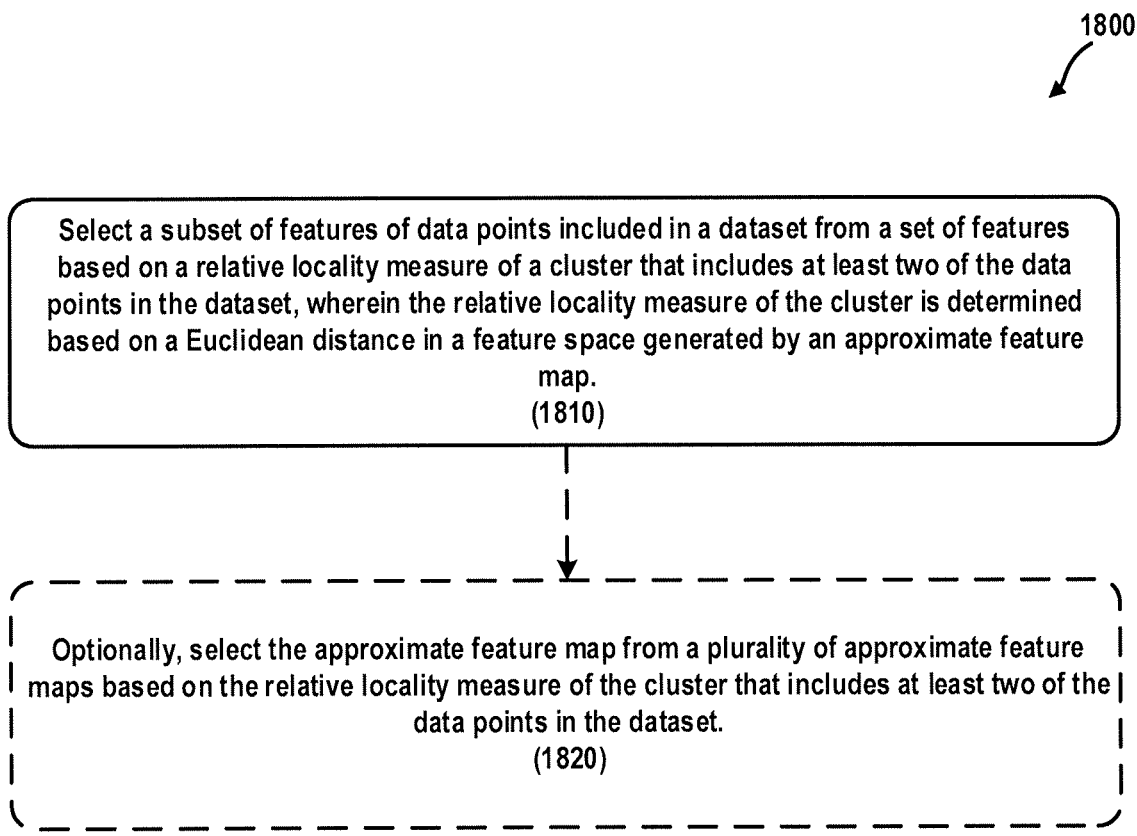
FIG. 18 is a flowchart illustrating a computer-implemented method operating on a dataset that includes data points of events of one or more users according to at least one embodiment.

FIG. 18 is a flowchart illustrating a computer-implemented method (1800) operating on a dataset that includes data points of events of one or more users according to at least one embodiment. First, a subset of features of data points included in the dataset is selected (1810) from a set of features based on a relative locality measure of a cluster that includes at least two of the data points in the dataset, wherein the relative locality measure of the cluster is determined based on a Euclidean distance in a feature space generated by an approximate feature map. Optionally, second, the approximate feature map is selected (1820) from a plurality of approximate feature maps based on the relative locality measure of the cluster that includes at least two of the data points in the dataset.

Figure 19:
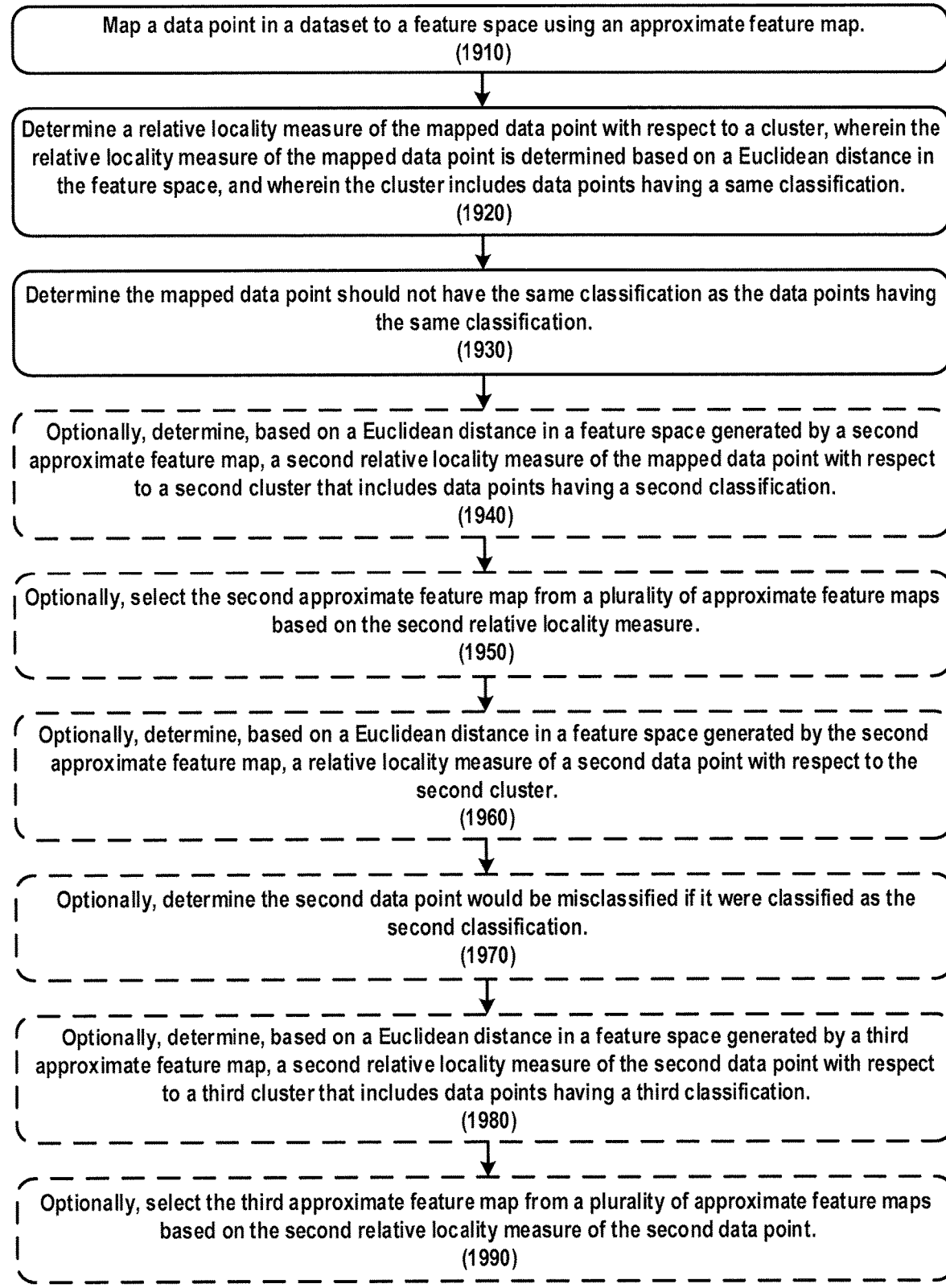
FIG. 19 is a flowchart illustrating a computer-implemented method operating on a dataset that includes data points of events of one or more users according to at least one embodiment.

FIG. 19 is a flowchart illustrating a computer-implemented method (1900) operating on a dataset that includes data points of events of one or more users according to at least one embodiment. First, a data point in the dataset is mapped (1910) to a feature space using an approximate feature map. Second, a relative locality measure of the mapped data point with respect to a cluster is determined (1920), wherein the relative locality measure of the mapped data point is determined based on a Euclidean distance in the feature space, and wherein the cluster includes data points having a same classification. Third, it is determined (1930) that the mapped data point should not have the same classification as the data points having the same classification. Optionally, fourth, based on a Euclidean distance in a feature space generated by a second approximate feature map, a second relative locality measure of the mapped data point is determined (1940) with respect to a second cluster that includes data points having a second classification. Optionally, fifth, the second approximate feature map is selected (1950) from a plurality of approximate feature maps based on the second relative locality measure. Optionally, sixth, based on a Euclidean distance in a feature space generated by the second approximate feature map, a relative locality measure of a second data point is determined (1960) with respect to the second cluster. Optionally, seventh, it is determined (1970) the second data point would be misclassified if it were classified as the second classification. Optionally, eighth, based on a Euclidean distance in a feature space generated by a third approximate feature map, a second relative locality measure of the second data point is determined (1980) with respect to a third cluster that includes data points having a third classification. Optionally, ninth, the third approximate feature map is selected (1990) from a plurality of approximate feature maps based on the second relative locality measure of the second data point.

With respect to the use of substantially any plural and/or singular terms herein, those having ordinary skill in the art can translate from the plural to the singular and/or from the singular to the plural as is appropriate to the context and/or application. The various singular/plural permutations may be expressly set forth herein for sake of clarity.

Embodiments of the subject matter have been described. Other embodiments are within the scope of the following claims. In some cases, the actions recited in the claims can be performed in a different order and still achieve desirable results. In addition, the processes depicted in the accompanying figures may not necessarily require the order shown, or sequential order, to achieve desirable results. In certain implementations, multitasking and parallel processing may be advantageous.

What is claimed is:

1. A computer-implemented method operating on a dataset that includes data points of electronic communication events of one or more genuine users, the method comprising:
receiving, by a server, a new data point from a purported user purporting to be a genuine user;
selecting, by the server, a feature space and a feature map for a cluster that maximize a first relative locality measure of the cluster, wherein the cluster includes at least two of the data points in the dataset, wherein the first relative locality measure of the cluster is determined based on a Euclidean distance of each data point within the cluster in the feature space, wherein the cluster is associated with the genuine user;

determining, by the server, a second relative locality measure of the new data point with respect to the cluster associated with the genuine user in the selected feature space; and authenticating, by the server, the new data point from the purported user based on whether the second relative locality measure satisfies a threshold associated with the cluster associated with the genuine user.

2. The computer-implemented method of claim 1, further comprising: mapping the dataset using the selected feature map.

3. The computer-implemented method of claim 1, further comprising:
classifying the new data point based on the second relative locality measure of the new data point, wherein the second relative locality measure of the new data point is determined based on a Euclidean distance in the feature space generated by the selected feature map.

4. The computer-implemented method of claim 3, wherein the classifying the new data point based on the second relative locality measure of the new data point includes authenticating the new data point.

5. The computer-implemented method of claim 3, wherein the classifying the new data point based on the second relative locality measure of the new data point includes associating a fraud label with the new data point.

6. The computer-implemented method of claim 3, wherein the new data point includes at least one of a phoneprint, information identifying a user, metadata associated with the caller identifier (ID), an intention of a user, a phone number, a voiceprint, information relating to automatic number identification (ANI) features, or a transaction request type.

7. The computer-implemented method of claim 3, wherein the data points in the dataset are each classified in at least one class from a set of classes, and wherein the classifying the new data point based on the second relative locality measure of the new data point includes classifying the new data point in a class not included in the set of classes.

8. The computer-implemented method of claim 3, wherein the classifying the new data point based on the second relative locality measure of the new data point is based on a relative locality measure of the new data point with respect to a data point in a cluster.

9. The computer-implemented method of claim 3, wherein the classifying the new data point based on the second relative locality measure of the new data point is based on a relative locality measure of the new data point with respect to a centroid of a cluster.

10. The computer-implemented method of claim 9, wherein coordinates of a centroid of a cluster including at least two of the data points in the dataset are stored in a memory device.

11. The computer-implemented method of claim 3,
wherein the new data point is generated during a phone call and pertains to the phone call,
wherein the classifying the new data point based on the second relative locality measure of the new data point is completed during the phone call, and
wherein a classification of the new data point is displayed on a display.

12. The computer-implemented method of claim 3, further comprising:
assigning a classification to the new data point based on the second relative locality measure of the new data point; and authenticating, based on the classification assigned to the new data point, a user during a phone call,
wherein the new data point includes numerical features pertaining to the phone call.

13. The computer-implemented method of claim 1, wherein the first relative locality measure of the cluster is determined using at least one of:
a relative locality measure of a data point in the cluster to a centroid of the cluster; or
a relative locality measure of a data point in the cluster to another data point in the cluster.

14. The computer-implemented method of claim 1, wherein the selected feature map is a kernel map.

15. The computer-implemented method of claim 1, further comprising determining a plurality of feature maps.

16. The computer-implemented method of claim 15, wherein the determining the plurality of feature maps is done using at least one of a Nyström method, a random Fourier features approximation, or a random binning transform.

17. The computer-implemented method of claim 1, wherein the cluster includes data points of events pertaining to at least two different users, and wherein each of the data points in the cluster has a same classification.

18. The computer-implemented method of claim 17, wherein the same classification of each of the data points in the cluster is a fraud classification.

19. The computer-implemented method of claim 1, further comprising:
selecting a feature map from a plurality of feature maps based on at least one of:
the first relative locality measure of a cluster that includes at least two of the data points in the dataset; or
a subset of features included in at least one of the data points in the dataset.

20. The computer-implemented method of claim 19, wherein the subset of features included in the at least one of the data points in the dataset is a subset of feature types.

21. A computer-implemented method of authenticating a purported user, the computer-implemented method comprising:
receiving, by a server, a new data point from the purported user purporting to be a genuine user;
mapping, by the server, using a feature map, the new data point to a feature space, wherein the new data point includes numerical features pertaining to the phone call of the purported user;
determining, by the server, a relative locality measure of the new data point with respect to a cluster associated with the genuine user in the feature map; and
authenticating, by the server, based on whether the relative locality measure of the new data point satisfies a threshold associated with the cluster associated with the genuine user, the purported user during the phone call,
wherein the cluster includes data points of events of the genuine user.

22. The computer-implemented method of claim 21, further comprising:
authenticating, based on the relative locality measure of the new data point to a centroid of the cluster mapped to the feature space, the purported user during the phone call,
wherein the new data point includes features of at least one of a phoneprint of the phone call or a voiceprint of the purported user, and wherein the centroid of the cluster is stored in a memory device.

23. The computer-implemented method of claim 22, further comprising:
including the new data point in the cluster;
determining a new centroid of the cluster after the new data point is included in the cluster; and
storing the new centroid of the cluster in a memory device.

24. The computer-implemented method of claim 23, wherein the new centroid of the cluster is determined based on the coordinates in the feature space of all data points included in the cluster, and wherein the feature map is determined using at least one of a Nyström method, a random Fourier features approximation, or a random binning transform.

25. A system that authenticates a purported user, the system operating on a dataset that includes data points, each data point including features, the system comprising:
at least one processor;
a memory device coupled to the at least one processor having instructions stored thereon that, when executed by the at least one processor, cause the at least one processor to:
select a feature map from a plurality of feature maps based on a relative locality measure of a cluster that includes at least two of the data points in the dataset;
select a subset of features in each data point;
map, to a feature space, the subset of features in each data point using the selected feature map;
receive a new data point from the purported user purporting to be a genuine user;
map, to the feature space, features included in the new data point using the selected feature map;
determine a relative locality measure of the new data point with respect to a cluster associated with the genuine user in the selected feature map;
determine a classification of the new data point based on whether the relative locality measure of the new data point satisfies a threshold associated with the cluster associated with the genuine user; and
authenticate the purported user.

26. The system of claim 25,
wherein the new data point pertains to a phone call of the purported user,
wherein the at least one processor is further caused to, responsive to the determination of the classification of the new data point, authenticate the purported user during the phone call, and
wherein the classification of the new data point is stored in a memory device.

27. The system of claim 25, wherein the at least one processor is further caused to determine the plurality of feature maps.

28. The system of claim 25, wherein the relative locality measure of the cluster is determined based on a Euclidean distance in a feature space generated by the selected approximate feature map.

29. A computer-implemented method of denying authentication to a purported user, the method comprising:
receiving, by a server, a new data point from the purported user purporting to be a genuine user;
mapping, by the server, using a feature map, the new data point to a feature space, wherein the new data point includes numerical features pertaining to the phone call of the purported user; and
determining, by the server, a relative locality measure of the new data point with respect to a cluster associated with the genuine user in the feature space;
denying, by the server, based on whether the relative locality measure of the new data point satisfies a threshold associated with the cluster associated with the genuine user, authentication to the purported user during the phone call.

30. A computer-implemented method operating on a dataset that includes data points of electronic communication events of one or more genuine users, the method comprising:
receiving, by a server, a new data point from a purported user purporting to be a genuine user;
selecting, by the server, a subset of features of data points included in the dataset from a set of features, a feature space and a feature map for a cluster that maximize a first relative locality measure of the cluster, wherein the cluster includes at least two of the data points in the dataset, wherein the first relative locality measure of the cluster is determined based on a Euclidean distance of each data point within the cluster in the feature space, wherein the cluster is associated with the genuine user; and
determining, by the server, a second relative locality measure of the new data point with respect to the cluster associated with the genuine user in the selected feature space; and
authenticating, by the server, the new data point from the purported user based on whether the second relative locality measure satisfies a threshold associated with the cluster associated with the genuine user.

31. The computer-implemented method of claim 30, further comprising:
selecting the feature map from a plurality of feature maps based on the first relative locality measure of the cluster that includes at least two of the data points in the dataset.

32. A computer-implemented method operating on a dataset that includes data points of electronic communication events of one or more genuine users, the method comprising:
receiving, by a server, a new data point from a purported user purporting to be a genuine user;
mapping, by the server, the new data point in the dataset to a feature space using a feature map;
determining, by the server, a relative locality measure of the mapped data point with respect to a cluster associated with the genuine user in the feature space, wherein the relative locality measure of the mapped data point is determined based on a Euclidean distance in the feature space, and wherein the cluster includes data points having a same classification; and
determining, by the server, the mapped data point should not have the same classification as the data points within the cluster based on whether the relative locality measure satisfies a threshold associated with the cluster associated with the genuine user.

33. The computer-implemented method of claim 32, further comprising:
determining, based on a Euclidean distance in a feature space generated by a second feature map, a second relative locality measure of the mapped data point with respect to a second cluster that includes data points having a second classification; and
selecting the second feature map from a plurality of feature maps based on the second relative locality measure.

34. The computer-implemented method of claim 33, wherein the mapped data point and the data points in the second cluster have the second classification.

35. The computer-implemented method of claim 33, further comprising:
- determining, based on a Euclidean distance in a feature space generated by the second feature map, a relative locality measure of a second data point with respect to the second cluster;
- determining the second data point would be misclassified if it were classified as the second classification;
- determining, based on a Euclidean distance in a feature space generated by a third feature map, a second relative locality measure of the second data point with respect to a third cluster that includes data points having a third classification; and
- selecting the third feature map from a plurality of feature maps based on the second relative locality measure of the second data point.

36. The computer-implemented method of claim 32, further comprising:
- determining, based on a Euclidean distance in a feature space generated by a second feature map, a second relative locality measure of the mapped data point with respect to a second cluster that includes data points having a second classification; and
- selecting a subset of features of data points included in the dataset from a set of features based on the second relative locality measure of the mapped data point.

* * * * *